Oct. 16, 1962 — R. W. TRIPP — 3,058,657
VARIABLE SPEED DRIVE INTERPOLATION SYSTEM
FOR AUTOMATIC MACHINE CONTROL
Original Filed Nov. 15, 1956 — 15 Sheets-Sheet 1
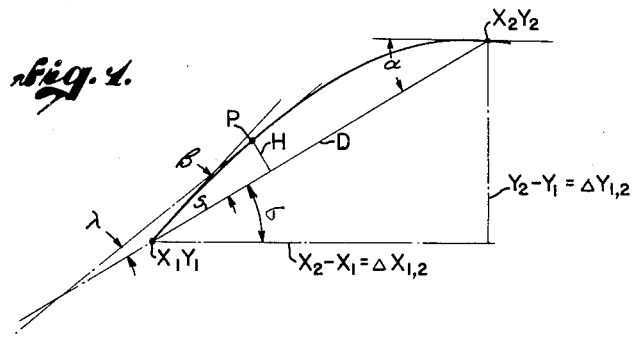
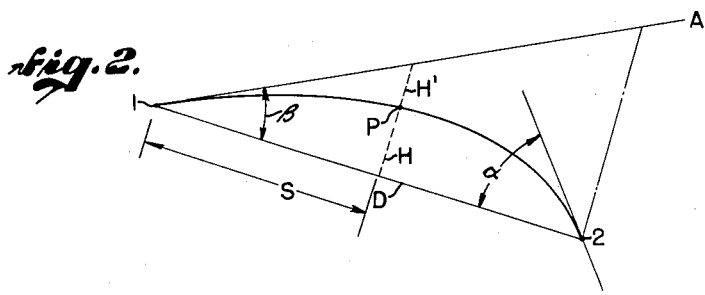
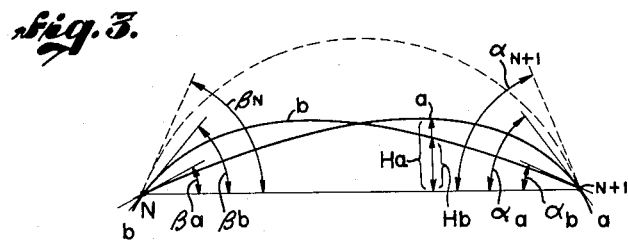
ROBERT W. TRIPP,
INVENTOR.
BY *W E Beatty*
ATTORNEY.

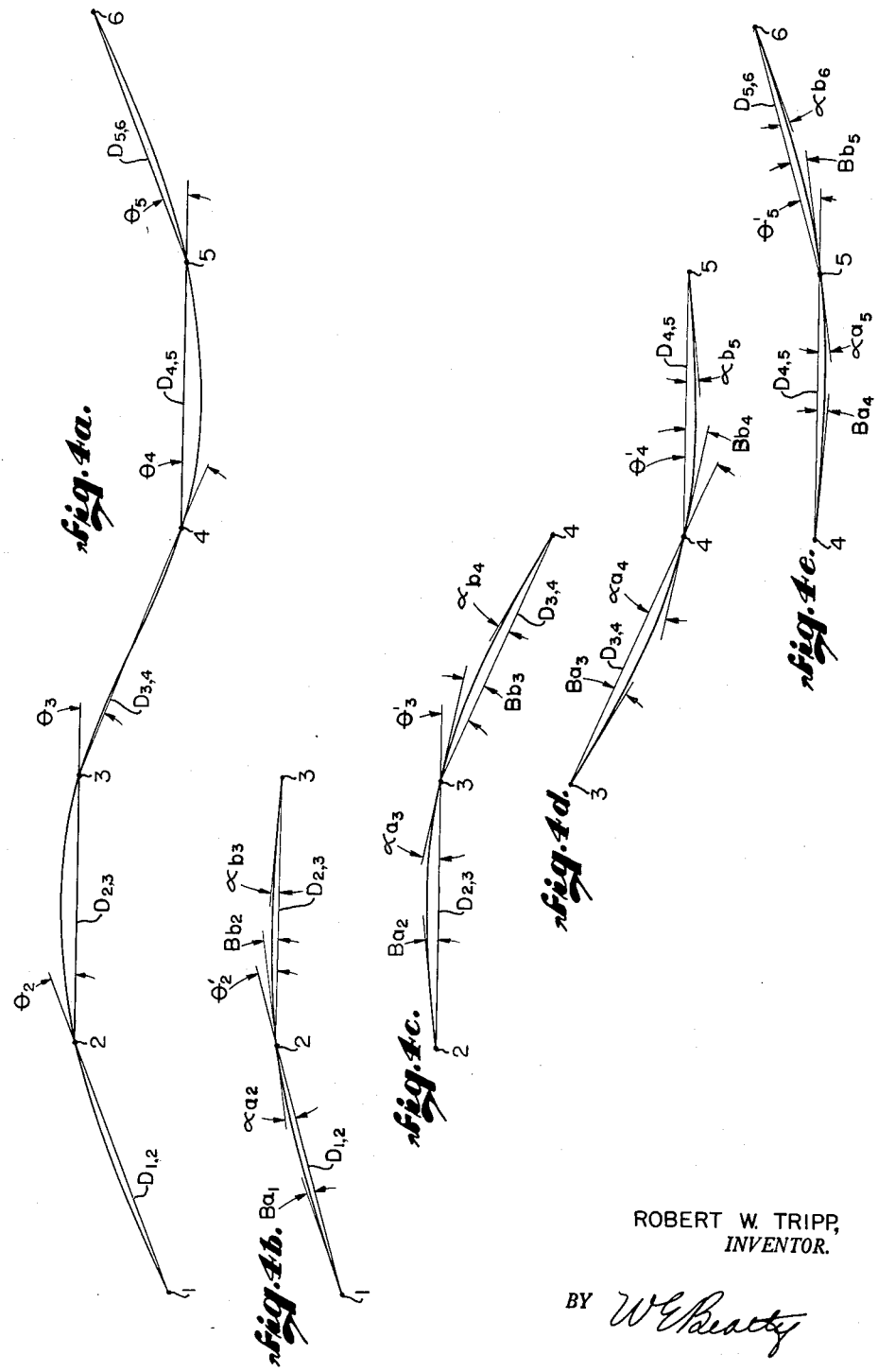

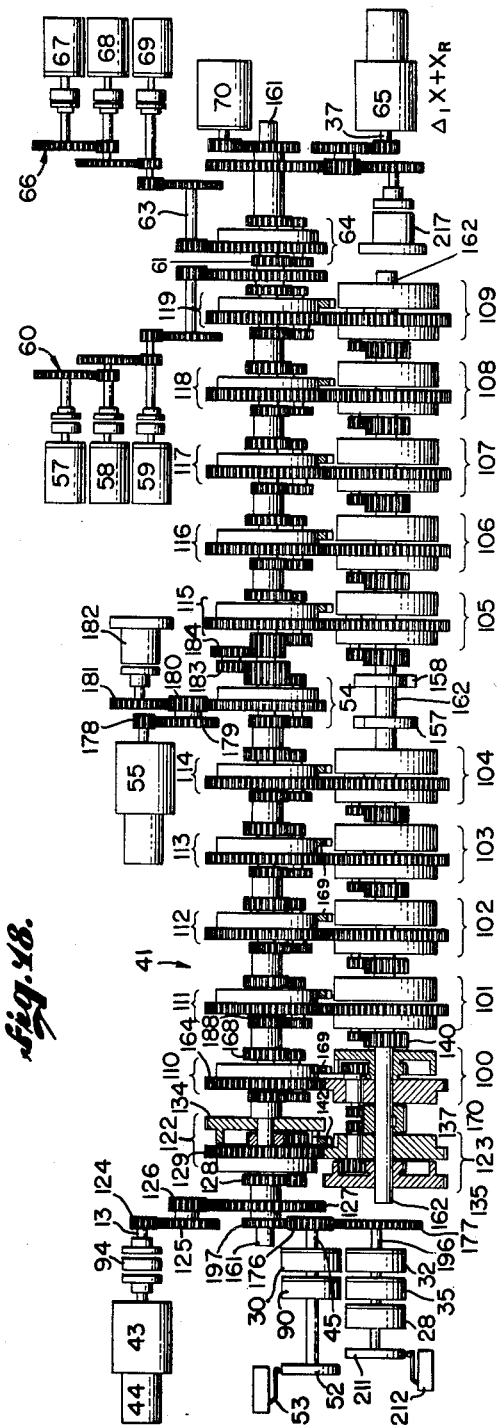

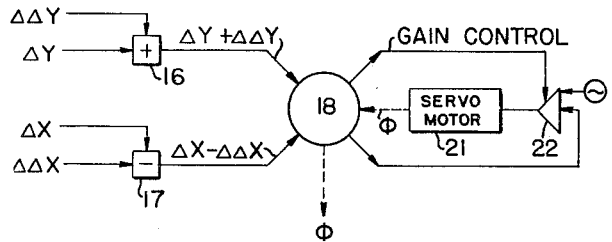
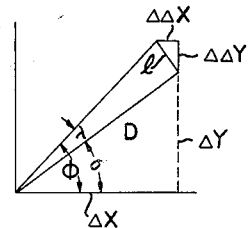
$$\Delta\Delta X = \frac{\ell}{D}(\Delta Y) = (\tan\lambda)\Delta Y$$
$$\Delta\Delta Y = \frac{\ell}{D}(\Delta X) = (\tan\lambda)\Delta X$$
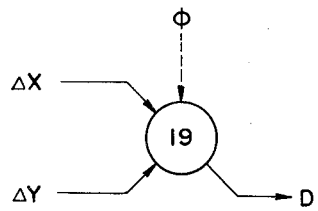
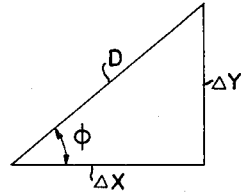
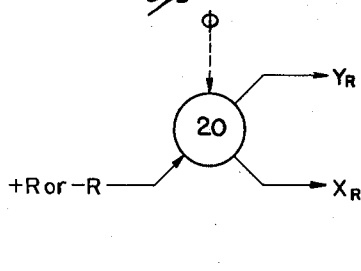
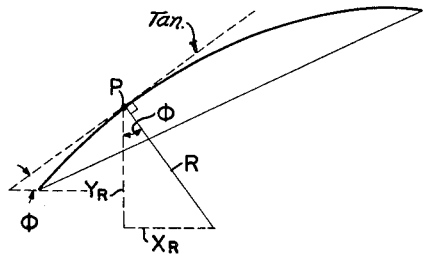
ROBERT W. TRIPP,
*INVENTOR.*
BY *W E Beatty*
ATTORNEY.

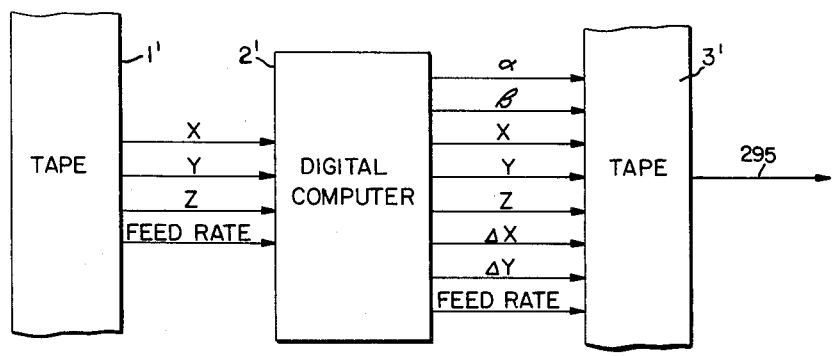

ROBERT W. TRIPP,
INVENTOR.

BY W E Beatty

ATTORNEY.

ROBERT W. TRIPP, INVENTOR.

BY *W E Beatty*

ATTORNEY.

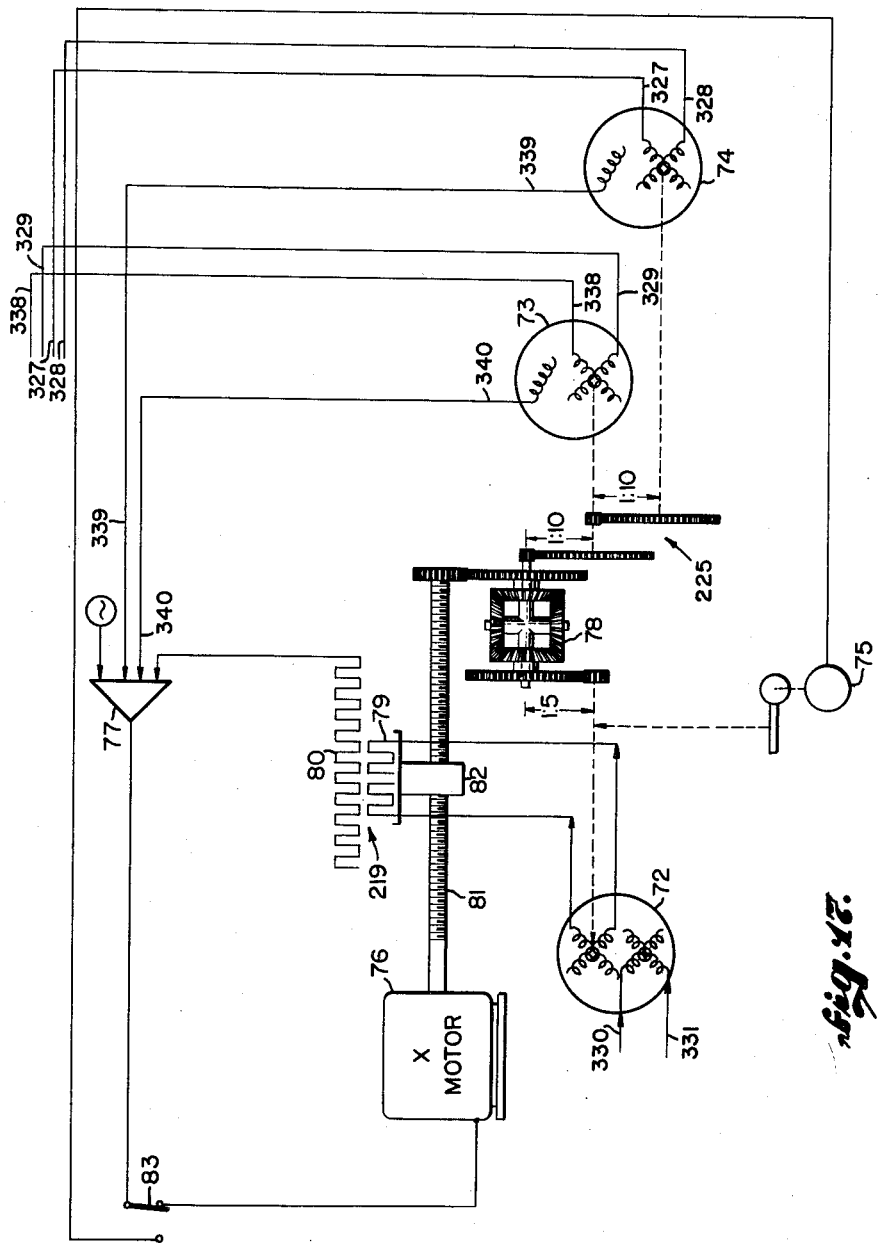

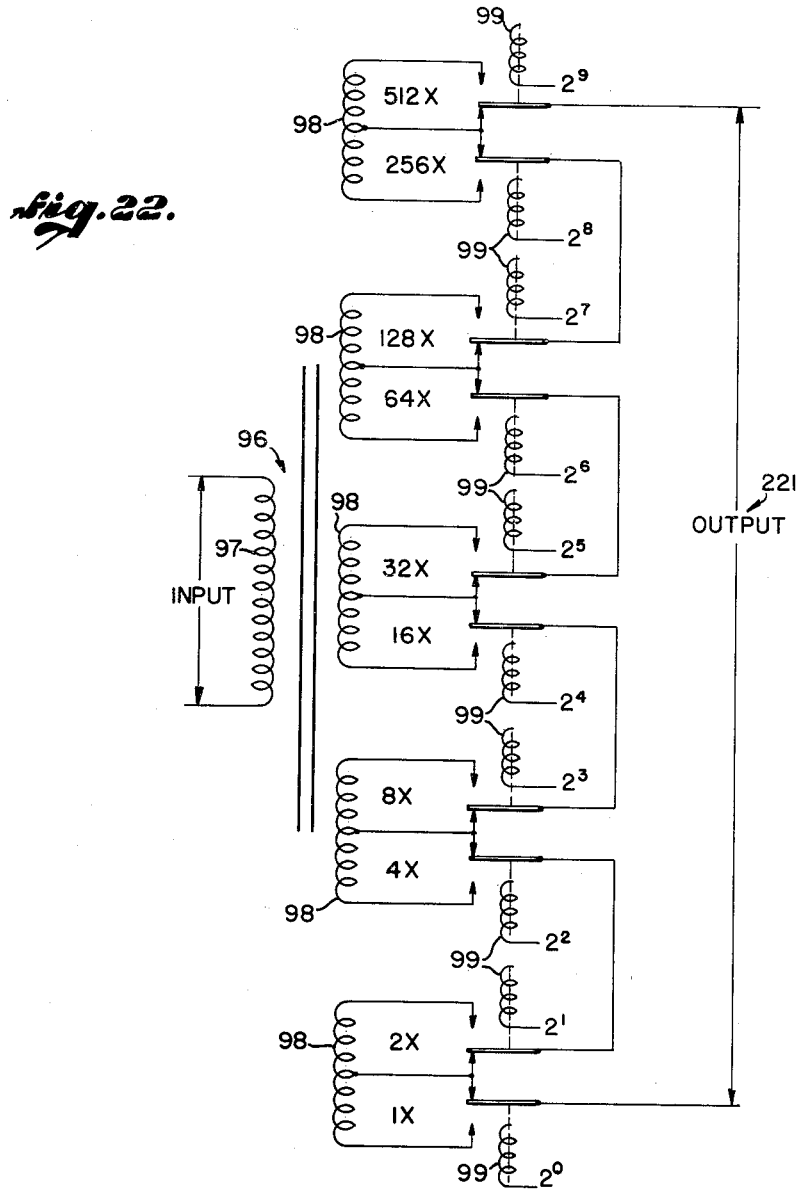

United States Patent Office 3,058,657
Patented Oct. 16, 1962

3,058,657
VARIABLE SPEED DRIVE INTERPOLATION SYSTEM FOR AUTOMATIC MACHINE CONTROL
Robert W. Tripp, Bronxville, N.Y., assignor to Inductosyn Corporation, Carson City, Nev., a corporation of Nevada
Original application Nov. 15, 1956, Ser. No. 622,397. Divided and this application Sept. 11, 1957, Ser. No. 683,378
5 Claims. (Cl. 235—154)

The invention relates to a variable speed drive interpolation system for automatic machine control which will accept input data in digital form and control the motion of a tool relatively to a work piece along a straight path, or along a continuous curve instead of generating a straight line segmental approximations as heretofore proposed, for example in the M.I.T. milling machine control. The tool may be either the cutting tool of a milling machine, lathe, profiler or the like, or it may be the scriber or stylus of a drafting or engraving machine for generating curves.

In U.S. application, S.N. 557,035 filed Jan. 3, 1956 for "Automatic Machine-Control Method and System," now Patent 2,875,390 dated February 24, 1959, hereafter referred to as Case 3 there is disclosed and claimed an automatic machine tool control method and system which will also accept digital input data for the purpose above mentioned. Case 3 and other patent applications referred to herein are assigned to the assignee of the present application.

The objects of the present invention include the features of an improved variable speed drive for reducing the amount of input data required, eliminating much of the effort required for programming the portion of the computation carried out on a digital computer, and resolving the instruction to the machine elements into a plurality of grades of increments of which the fine increment is preferably handled by a highly accurate position-measuring transformer such as the "Inductosyn" * as described in further detail later.

Case 3 and several other pending applications referred to later describe and claim the generation of a complex curve by what is essentially extrapolation, in that the various inputs namely, the coordinates of the points and slope, curvature and rate of change of curvature are integrated to direct the path towards the next point on the curve to be generated. This approach involves digital-to-analog conversion of input data into a shaft rotation, resolving the angular position or movement of the shaft into co-function values having the relation of sine and cosine of the shaft angle and integrating the feed rate of the machine drives along the X and Y axes with such sine and cosine values respectively whereby the machine elements are controlled relatively to each other in a manner defining the straight line or complex curve designated in the input. Depending upon the accuracy of the constants and of the integration, the line or curve thus generated may or may not hit the next point exactly. Thus there is need to provide for checking and correcting as described and claimed in U.S. application S.N. 563,125, now abandoned, filed Feb. 2, 1956 for "Automatic Digital Machine Tool Control," hereinafter referred to as Case 4.

As compared to Cases 3 and 4, an object of the invention is to simplify the apparatus required, avoid inaccuracies due to use of mechanical devices such as ball-disk-cylinder integrators for performing mathematical operations, avoid the necessity for checking the correctness of the tool path, and provide apparatus wherein the correctness of the tool path is inherently checked, while \* Registered trademark.

generating or machining a continuous curve. This is accomplished by generating the curve by an interpolation method in which the curve is fitted between point pairs and goes through each point without errors of integration. The accuracy of the approximation to a spline fit depends upon the separation of the points and upon the nature of the curve as explained in further detail later. The amount of data required according to the invention can be reduced by selecting the distance between data points with due regard to the required curve shape and the permissible error. The use of the variable speed drive of this invention also makes it possible to maintain a constant cutting speed even though each cycle of the feed rate includes point pairs having different separations.

It is possible to obtain the required machine input data with certain relatively simple arithmetical operations. The specification develops the required mathematical equations. The only original data needed for the evaluation are the X and Y coordinates of a suitable number of points. When the equation of the curve is known, it is a very simple matter to compute the necessary input data to the machine, as well be hereinafter explained.

A particular advantage of the invention is that the machine can be stopped at any point of its sequence and be started again without loss of accuracy.

According to the invention, a curve is divided into segments, and the coordinates of each segment are taken as the sum of the coordinates of points along the chord between the point pairs for each segment and the distance from the chord to the curve, measured perpendicular to the chord. The invention is useful for continuously computing this sum in analog form from data of the segment and the chord and data of the required interpolation constants. A further object of the invention is to provide a variable speed drive useful in connection with the steps of continuously computing from such data the lengths of the perpendicular from the chord to the curve, resolving such perpendicular values into their components along the X and Y axes, adding such components to the corresponding components of the chord along such axes, and controlling the feed rates of the machine elements along those axes accordingly.

While the variable speed drive of this invention may be used for generating a straight line, or a succession of straight lines having different slopes, the invention is particularly useful for the generation of complex curves by generating successive curved segments. This involves the chord-to-tangent angle and the length of the chord for each segment and for the generation of continuous curves, it also involves preparing the instruction for the next segment while maintaining the instruction for a given segment with a quick shift from one instruction to the next. It is a particular object of the present invention to provide a variable speed drive useful for those purposes. Further features of the invention are to provide for adjusting the position of the required curve before starting, to provide for a separate introduction of cutter offset instruction, to provide a constant cutting rate independent of the length of each successive segment of the curve to be cut. A further feature is to provide for the generation of corners including means for stopping the feed rate drive until the new slope angle is established, while maintaining the cutter radius instruction active so that at the corner the machine will describe an arcuate path having a radius equal to the cutter radius whereby the cutter always remains in contact with the corner being cut. Provision is also made for zero offset as described and claimed in application S.N. 638,722, now Patent No. 2,950,427, filed Feb. 7, 1957 for Zero Offset for Machine Tool Control. In general, these objects and features are accomplished as follows:

The curve is divided into a plurality of successive segments the length of these segments being chosen with due regard for the required accuracy as explained later.

*Slope angle.*—The slope of the path depends on the ratio of the feed rates along the X and Y coordinate axes. This ratio is established by extending each of the X and Y drives through a variable speed ratio device, here illustrated as an improved digital gear device. The digital gear device disclosed and claimed herein is binary and, as to its generic aspects, is described and claimed in Case 3.

*Distance.*—The cord of each successive segment of the curve is obtained as follows. The two gear ratio units referred to above have an input shaft which is driven through one revolution or an integral number of revolutions for each segment, corresponding to a cycle of operation, and the gear ratio is changed only at the end of a cycle. This results in the X and Y output drive shafts making a number of revolutions or parts of revolutions proportional to the digital inputs. Thus the total angular travel of the two output shafts, for the X and Y axes, is proportional to the distance along those axes required to generate the chord of the segment.

*Instruction shift.*—Storage relays are provided for transfer of the input data into the gear ratio units during the cycle, without any pause in the motion of the output shafts for continuous curves. Also, each of the gear devices is constructed and arranged to maintain a given ratio while being urged to an alternate position corresponding to a change in the ratio, such change being prevented, however, until the end of the cycle, where the change is quickly effected. During the cycle, the analog-computer operates in synchronism with and may be driven by the input shaft for the gear units so that the computation of the curve data (X and Y components of the perpendicular distance from the chord to the curve), proceeds in space phase relation with the X and Y feed rate instructions which determine the length and slope of the chord.

*Position.*—This is added to the instruction generated by the analog computer equipment so that the machine may generate a curve at any desired point within its capacity.

*Cutter offset.*—Provision is made for computing the absolute value of the slope angle $\phi$ of the curve from the input values of the increments $\Delta X$ and $\Delta Y$, an adjustable tool radius input R being provided to resolve the tool radius R into the increments $X_R$ and $Y_R$ for addition to the other instructions pertinent to the X and Y axes. This is broadly described and claimed in U.S. application S.N. 561,769 filed January 27, 1956 for "Tool Radius Correction Computer" as applied to two axes, and is described and claimed as applied to three axes in S.N. 608,357 filed Sept. 6, 1956 for "Three Dimensional Tool Radius Correction Computer." Use of this feature permits various cutters to be employed without altering the input program.

*Constant cutting rate.*—As successive cycles may involve chords of different lengths, provision is made for operating the input drive to the gear ratio units at a speed inversely proportional to the length of the chord whereby a speed inversely proportional to the length of the chord whereby a substantially constant cutting rate is obtained.

*Corner routine.*—As described above, provision is made for reducing the feed rate to zero at a corner until the instruction of a new slope angle is set in, while maintaining the cutter radius instruction active so that the cutter always remains in contact with the corner being cut.

*Zero offset.*—Provision is made for locating the program zero as described with respect to the machine coordinates so that the part may be programmed in advance and the part located on the machine subsequently. The difference between the machine coordinate zero and the part coordinate zero is "zero offset." This is described and claimed in U.S. application S.N. 638,722, now Patent No. 2,950,427, filed Feb. 7, 1957 for "Zero Offset for Machine Tool Control."

*Sequence.*—Concerning the sequence of operation of the digital gear device in relation to the program advance, the objects of the invention are to hold the inputs to the differentials in the selected state from one command to another, change from one state to another at exactly the position desired, hold the digital input for a short time until the equipment is ready to accept it, hold the inputs energized independently of the storage circuits, utilize the storage circuits to hold the next data while current data is being used, and to provide a circuit which makes it possible to "read" the punched card or tape at a relatively slow rate and during times when the previous information is being held on the operating coils, while making it possible to change the state of the operating coils, and obtain the shaft speed called for by the input, very rapidly and at an accurately chosen time or under accurately chosen conditions.

In prior control systems referred to above, it has been customary to machine successive straight line segments to produce an approximation of the desired surface. A more satisfactory machined part and a very large reduction in the amount of the required input data, as well as increased flexibility and accuracy are obtained according to the present invention wherein the inputs include differences of position of points on the surface and interpolation constants for the surface to be cut, whereby the method and apparatus of the present invention are capable of machining continuous curves instead of straight line segmental approximations of the curve or surface to be cut.

In accordance with the present invention, each successive segment of a curve is generated from the values of (*a*) the differences between the coordinates of the end points of the segment, (*b*) the angle between the chord and the tangent at the cutting point, and (*c*) the departure H of the curve from the chord, measured perpendicularly to the chord from the cutting point on the curve. It is shown that the value of H is given by the equation:

$$H = \left[ \beta_a - \alpha_b + \beta_a \left(\frac{S}{D}\right) - \alpha_b \left(1 - \frac{S}{D}\right) \right] \frac{S(D-S)}{D} \quad (1)$$

and that the value of the angle $\lambda$ is given by the equation:

$$\tan \lambda = \frac{dH}{dS} = \beta_a \left(1 - \frac{3S^2}{D^2}\right) + \alpha_b \left[1 - 3\left(1 - \frac{S^2}{D}\right)\right] \quad (2)$$

In the above Equations 1 and 2, $\beta_a$ = starting interpolation angle of segment
$\alpha_b$ = ending interpolation angle of segment $$\alpha_b = -\frac{1}{3}(\alpha_{N+1} + 2\beta_N), \beta_a = -\frac{1}{3}(2\alpha_{N+1} + \beta_N) \quad (3)$$

where $\beta_N$ is the angle between the chord and the tangent to the curve at the first data point N of the curve segment and $\alpha_{N+1}$ is the angle between the chord and the tangent to the curve at the second data point N+1 of the curve segment.

D = chord distance between adjacent data points.
S = distance measured along the chord to a perpendicular from the chord to the cutting point on the curve.

It is further shown that instantaneous values of the coordinates of points X′, Y′, on the path to be followed by the center of the cutter are given by the following equations which appear later as Equations 62 and 63:

$$X' = X_N + S\frac{\Delta X}{D} - H\frac{\Delta Y}{D} + X_R \quad (4)$$

$$Y' = Y_N + S\frac{\Delta Y}{D} + H\frac{\Delta X}{D} + Y_R \quad (5)$$

In Eqs: 62 and 63, $X_N$ = abscissa of hte first data point N
$X$ = difference in abscissae between adjacent data points $X_R = X$ component of cutter radius
$Y_N =$ ordinate of the first data point
$Y =$ difference in in ordinates between adjacent data points
$Y_R = Y$ component of cutter radius It is also shown that the value of tan λ as given in Eq. 2 is taken into account in computing the cutting offset components $X_R$ and $Y_R$.

A further feature of the invention is to provide a method of computing the necessary input values of α, β, ΔX and ΔY in digital form and continuously computing signal valeus of H, (Eq. 1) and $$\frac{H}{D}$$

and also tan λ, (Eq. 2) and from these signal values to continuously compute the terms included in Equations 62 and 63 and add the terms for each equation as indicated, and control the feed rate of the machine elements on coordinate X and Y axes accordingly.

It is shown that in the case where the equation of the curve is known, the values of α and β are readily determined, whereas, if the equation of the curve is not known, the values of α and β may be computed by analogy to a spline fit, from data of the points of preceding and succeeding segments of the curve.

The above objects are accomplished by employing a precision position measuring transformer to attain high precision, and by employing analog computers to provide continuous data of position, to drive servos which position the machine element relatively to the work piece to be cut.

While the invention will be described with reference to two orthogonal axes, referred to as the X and Y axes, with the Z axis used for positional control only, it will be apparent that the interpolation method and means herein described may be extended to apply also to a third axes Z at right angles to the plane of the X and Y axes.

There are several known mathematical interpolation methods by which an equation, or a series of equations, can be obtained, which will closely approximate any desired curve. In the preferred mathematical method herein described, the equations of the curve itself are not computed or required. Instead, the mathematical theory of stress and strain is employed to compute selected parameters of a spline fit to the required curve, or a very close approximation to such spline fit.

The selected parameters are computed for successive pairs of points along the desired curve as given, or taken sufficiently close together to insure the required accuracy of approximation to the desired curve. The computation for each pair of points is based upon the relative locations of prior and subsequent points along the curve. So far as is known, this mathematical method of producing a close approximation to a desired curve has previously not been disclosed.

The equations which are herein developed and employed to give effect to the location of prior and subsequent points in determining the path to be followed between each successive pair of points, are based upon the use of two prior and two subsequent points. It is to be understood, however, that the mathematical method is equally applicable to single prior and subsequent points or to three or more prior and subsequent points, and that the invention is therefore not limited to any particular number of prior and subsequent points.

The selected parameters to be used are computed on a digital computer which may be of any suitable type, and which is not claimed as part of the invention. These parameters are recorded by the digital-computer in any convenient form, such as punched cards or punched paper tape.

The computed parameters are employed in a combination of electrical, electronic and mechanical components to be described, to cause the cutter or other tool of a milling machine or the like to reproduce the desired curve upon any desired number of work pieces.

In the illustrative embodiment herein described, the X and Y components of the perpendicular distance from the chord between any two points to successive points on the interpolated curve are computed in analog form and added to the successive X and Y components of the chord, to guide the cutter or other tool along a path which will reproduce the interpolated curve.

The present application is a division of S.N. 622,397 filed November 15, 1956 by Robert W. Tripp for "Interpolating Method and System for Automatic Machine Tool Control" which discloses and claims the machine tool features of the present case. The binary gear device disclosed herein is disclosed and claimed in Ser. No. 683,402 filed September 11, 1957 for "Binary Gear Device," now Patent 2,902,887 dated September 8, 1959. The computing method and system disclosed herein is disclosed and claimed in Ser. No. 683,403 filed September 11, 1957 for "Interpolation Computing Method and System for Automatic Tool Control." The last two mentioned applications are further divisions of Ser. No. 622,397.

For further details of the invention reference may be made to the drawings wherein FIGS. 1, 2, 3, 4a to 4e and FIG. 5 are schematic figures illustrating a curve and its components involved in mathematical equations given later in connection with computing the segment of the curve from certain parameters of the curve, FIGS. 4a to 4e, being useful in connection with computing the starting and ending chord-to-tangent angles of the curve where the curve function is not known. FIG. 4a illustrates a spline fit through 6 points. FIGS. 4b to 4e illustrate the 3-point spline components of the curve in FIG. 4a.

FIG. 6a is a schematic diagram of a portion of the system in FIG. 12, illustrating a resolver with its inputs and outputs for computing the slope angle φ between the X axis and the tangent at the cutting point on the curve, FIG. 6b being the corresponding geometrical diagram.

FIG. 7a is a schematic diagram of another portion of the resolver referred to above, illustrating the inputs ΔX and ΔY for computing the chord length D, FIG. 7b being the corresponding geometrical diagram.

FIG. 8a is a schematic diagram of another portion of the resolver device of FIGS. 6a and 7a illustrating the tool radius input to be resolved into components along the X and Y axes, FIG. 8b being the corresponding geometrical diagram.

FIG. 9 is a block diagram illustrating how FIGS. 10 to 16 are arranged edge-to-edge to illustrate a complete system capable of operating in accordance with the method the present invention, the input of FIG. 10 operating through the various computers and controls illustrated in FIGS. 11 to 15, to control the machine elements illustrated in FIG. 16.

FIG. 17 is an enlarged view of the zero offset control illustrated schematically in FIG. 16, FIG. 17 illustrating this item for the X motor, a similar control, not shown, being provided for the Y motor.

FIG. 18 is a view, partly in section, which may be considered either a plan view or a side view in elevation of the gear mechanism and associated parts illustrated in FIG. 14 for the X axis, a similar gear mechanism with its associated parts not shown being also provided as shown schematically in the Y axis in FIG. 14.

FIG. 19 is an enlarged sectional view of the gear device of FIG. 18, the section being taken on line 19—19 of FIG. 20, looking in the direction of the arrows, and illustrating the controls for reversing the drive.

FIG. 20 is a section taken on line 20—20 of FIG. 19.

FIG. 21 is a section taken on the broken line 21—21 of FIG. 19 and shows the gear 159 which meshes with the gears 134 and 135.

FIG. 22 is a diagram of the linear digital-to-analog converter and multiplier employed in the systems of FIGS. 10 to 16.

Figure 23:
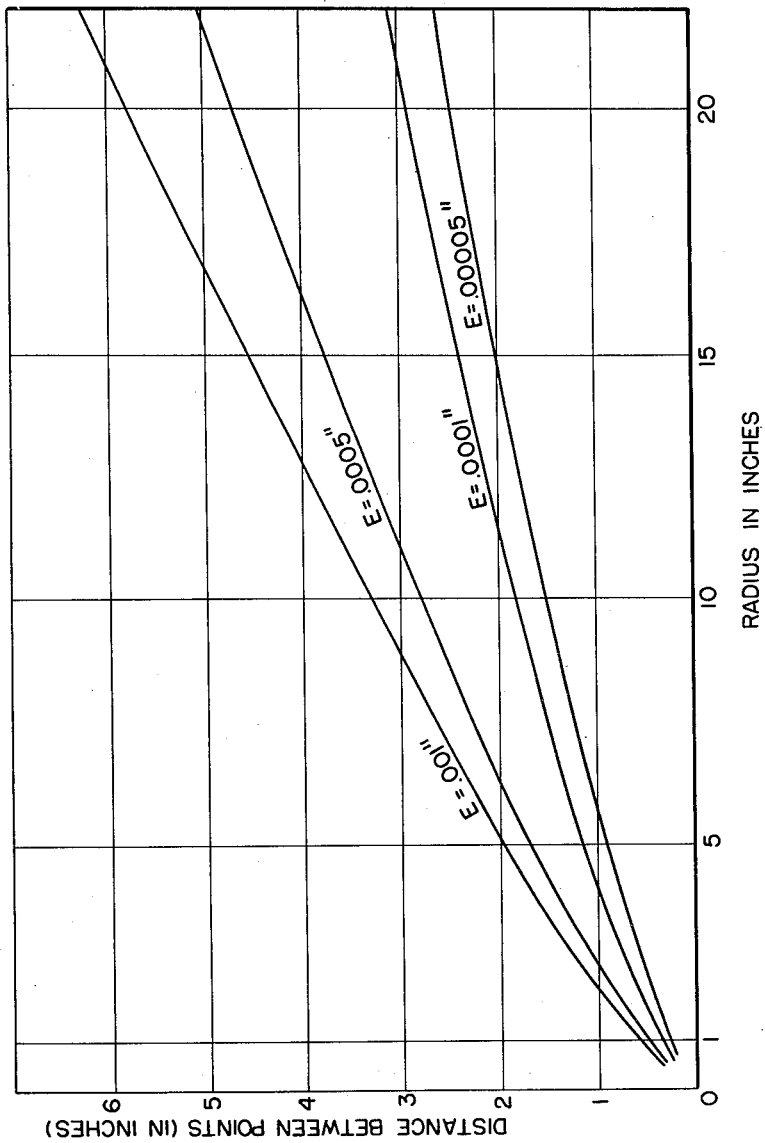

FIG. 23 is a graph illustrating the relation of the distance between data points to the departure of the generated curve from a circular arc.

FIG. 24 is an enlarged sectional view, with parts broken away, illustrating the clutch or detent arm for each of the ten binary gear drives 100 to 109 in FIG. 18.

The following is a list of the symbols used in this specification, with their definitions; as illustrated in FIGS. 1 to 8.

$X'$ = instantaneous value of the abscissa of the cutter center along the machine X axis $Y'$ = instantaneous value of the ordinate of the cutter center along the machine Y axis $X_N$ = abscissa along X axis of data point N $Y_N$ = ordinate along Y axis of data point N $X_p$ = abscissa of the cutting point along X axis $Y_p$ = ordinate of the cutting point along Y axis $X_R$ = X component of cutter radius $Y_R$ = Y component of cutter radius $\Delta X$ = difference between the abscissae of adjacent data points $\Delta Y$ = difference between the ordinates of adjacent data points $\Delta_1 X$ = X component of H (see H below)

$\Delta_1 Y$ = Y component of H (see H below)

$H$ = departure of the curve from the chord D, measured perpendicular to D from the point P on the curve.

$H'$ = deflection of a beam anchored at point 1 and bent to pass through point 2. (See FIG. 2.)

$D$ = chord distance between adjacent data points $C$ = constant $S$ = distance measured along the chord D $R$ = cutter radius $\sigma$ = slop angle between the chord D and the X axis $\lambda$ = angle between the chord and the tangent at the cutting point P $\theta$ = the angle between two successive chords $\phi$ = slope angle of the tangent at P $\beta_N$ = the angle between the chord of a curve segment N, N+1 and the tangent to the curve segment at N, or, chord-to-tangent angle.

$\alpha_N$ = the angle between the chord of a curve segment N−1, N and the tangent to the curve segment at K, or, chord-to-tangent angle.

$\beta = \beta_a$ as applied to Equations 1 and 2. (See FIG. 3.)

$\alpha = \alpha_b$ For FIGURE 4, $\beta = \beta_a = \beta_{a3}$ and $\alpha = \alpha_b = \alpha_{b4}$ $\Delta \Delta X = (\tan \lambda) \Delta Y$ $\Delta \Delta Y = (\tan \lambda) \Delta X$ See FIG. 6.

Sign Conventions

The sign conventions employed in the following discussion are:

(1) Angles are positive when measured counter-clockwise.

(2) An angle between a chord and a tangent is measured from the chord to the tangent.

(3) An angle between two chords is measured from the extension of the first chord to the second chord.

(4) Distances along chord are taken as positive in the direction of motion. Distances normal to chords are taken as positive to the left of the direction of motion.

(5) Lengths of chords are taken as positive.

Mathematics of the Interpolation Method

Consideration will now be given to the mathematics of the interpolation method, first for the general case where the equation of the curve is not known, and then for the case where the equation of the curve is given.

*Equation of the curve not known.*—The general case is the one in which the equation of the curve is not known. In this case, the digital computer 2′, FIG. 10, computes the lengths D of the chords and the angles $\theta$ from the values of X and Y between the chords. Using Equations 35, 36, 37 and 38 to find values of $C_3$ and $C_4$, it then computes the required values of the chord-to-tangent angles $\alpha$ and $\beta$ from Equations 33 and 34. These equations are explained later.

Equations 1 and 2 are those of the required parameters of a close approximation to the curve which would be produced by a spline, or a uniform flexible strip which is caused to pass through the given points on the curve. The use of such a spline or strip is well-known in the drafting and layout arts. The validity of the equations may be demonstrated in the following way: If a beam 1, 2 (FIG. 2), fixed at the point 2, is bent by a force normal to the beam at point 1 so that the beam after bending passes through the point 1, its behaviour may be analyzed in the following way: there is set up a bending moment which varies along the beam, its magnitude at any point P being proportional to the distance, S, from the point 1. This is a well-known principle, fundamental in the theory of stress and strain, and presented in any treatise on strength of materials. In FIG. 2, and, indeed, in the usual treatment of beams, it is considered immaterial to the discussion whether the distances involved are measured along the tangent 1, A, along the chord 1, 2 or along the bent beam 1, P, 2 itself, since the angle A, 1, 2 is considered to be so small that the relationship angle=sine=tangent is a very close approximation. In the operation of the invention herein described, it is necessary that the points along the curve to be cut be taken sufficiently close together that this relationship is true without sensible error. This is not a tight restriction since, for reasons of accuracy, points would normally be taken sufficiently close together that this is the case.

The bending moment of the beam which is proportional in magnitude to the distance S along the beam (or along the tangent, or the chord), causes a change in the slope of the beam such that the rate of change of slope is proportional to said bending moment. From the principles of analytical geometry it is known that the slope of a curve $H = f(S)$ is given by the first derivative of H with respect to S, and the rate of change of slope is given by the second derivative of H with respect to S, or in common nomenclature, and with the notation of FIG. 2:

$$H' = f(S) \tag{6}$$

$$\frac{dH'}{dS} = f'(S) = \text{slope} \tag{7}$$

$$\frac{d^2 H'}{dS^2} = f''(S) = \text{rate of change of slope} \tag{8}$$

But it is known that the rate of change of slope is proportional to S, hence we may write $$\frac{d^2 H'}{dS^2} = k_1 S \tag{9}$$

and if a double integration is performed, there results the expression $$H' = k_2 S^3 + C_1 S + C_2 \tag{10}$$

where $C_1$ and $C_2$ are constants of integration, $C_1$ representing the initial slope and $C_2$ the initial deflection of the beam. In the situation represented in FIG. 2, both are zero, hence $$H' = kS^3 \tag{11}$$

To determine the value of $k$, we note in FIG. 2 that, when $S=D$, then $H'=D \tan \beta = D\beta$ by the small-angle approximation. Substituting these values in Equation 11 gives $$k = \frac{\beta}{D^2} \tag{12}$$

$$H' = S^3 \frac{\beta}{D^2} \tag{13}$$

We are interested, however, in the value of H, or departure of the curve from the chord. Referring to FIG. 2 and using the small-angle approximation:

$$(H+H') = S\beta \quad (14)$$

and, since $$H = (H+H') - H' \quad (15)$$

from Equations 13, 14 and 15, we have:

$$H = S\beta - S^3\frac{\beta}{D^2} \quad (16)$$

which may be written $$H\left(S - \frac{S^3}{D^2}\right)\beta \quad (17)$$

and the slope of the curve with respect to the chord may be obtained by taking the derivative of (17) with respect to S, obtaining $$\frac{dH}{dS} = \tan \lambda = \left(1 - \frac{3S^2}{D^2}\right)\beta \quad (18)$$

Now, at the point (2), $S=D$, and substitution in (18) gives $$\alpha = \frac{dH}{dS} = -2\beta \quad (19)$$

where $\alpha$ is the chord-to-tangent angle at the point 2.

In the case of the present invention, the beam in question (the assumed spline) is not fixed at either end of a given chord, so that the above analysis is insufficient to completely describe the case. The case may be described, however, to a close degree of approximation by considering a set of six (6) points of constraint, two to the left of and two to the right of the chord segment being considered. If this is done, the condition shown in FIGS. 4a to 4e exists, where the symbolism is consistent with that adopted in the above discussion.

In accordance with the principal of superposition, there is a unique set of four 3-point beams which determines the shape of the spline through six points. As will be explained in more detail presently, the chord-to-tangent angles $\alpha_b$ and $\beta_a$ of the 3-point beams are proportional to the chord lengths, and depend in magnitude upon the angles $\theta$ between successive chords, since, at each point, the sum of the $\alpha$ components plus the sum of the $\beta$ components is equal to the chord-to-chord angle $\theta$. (See Equation 28.) The sum of $\alpha_b$ and $\beta_a$ at the center of each 3-point is an angle $\theta'$, which in general is not equal to $\theta$, and need not be determined.

FIGS. 4b to 4e show the component 3-point splines used to compute the 6-point spline 4a. The curvature is zero at the end points of the four 3-point beams. Hence, at either side of the mid point of each 3-point beam, the chord-to-tangent angle is twice that the end of the beam, but is of opposite sign. (See Equation 19.)

The actual values of the chord-to-tangent angles at the chord ends are the algebraic sums of the component values illustrated in FIGS. 4b to 4e, that is to say $$\beta_N = \beta_{aN} + \beta_{bN}, \quad \alpha_N = \alpha_{aN} + \alpha_{bN} \quad (20)$$

From the theory of beam flexure, it may be shown that $$\frac{-\alpha_{aN}}{\beta_{bN}} = \frac{D_{N-1,N}}{D_{N,N+1}} \quad (21)$$

and in particular, for a chord 3, 4; we have $$\frac{-\alpha_{a3}}{\beta_{b3}} = \frac{D_{2,3}}{D_{3,4}} \quad (22)$$

This may be written $$\frac{-\alpha_{a3}}{\beta_{b3}} = \frac{D_{2,3}C_3}{D_{3,4}C_3} \quad (23)$$

where $C_3$ is a proportionality constant. If $\alpha_{a3}$ is proportional to $D_{2,3}$ as is indicated in Equation 23, then it can be stated that $\alpha_{a3} = D_{2,3}C_3$, and the equations for the component angles are as follows:

$$\alpha_{a3} = D_{2,3}C_3 \quad (24)$$

$$-\beta_{b3} = D_{3,4}C_3 \quad (25)$$

$$\alpha_{a4} = D_{3,4}C_4 \quad (26)$$

$$-\beta_{b2} = D_{2,3}C_2 \quad (27)$$

Now, the angles between the chords can be seen by inspection to be equal to the sum of the actual angles $\alpha_N$ and $\beta_N$ at a given point, and since, by the principle of superposition, the angles $\alpha_N$ and $\beta_N$ at a point are the sums of the respective components of these angles $\alpha_{aN} + \alpha_{bN}$ and $\beta_{aN} + \beta_{bN}$, we may write, for the angles between the two chords at the points 3

$$\theta_3 = \alpha_{a3} + \alpha_{b3} - \beta_{a3} - \beta_{b3} \quad (28)$$

where the algebraic signs have been appropriately chosen for the directions in which the angles are indicated. Now, from Equation 19

$$\beta_{a3} = -\frac{\alpha_{a4}}{2} \quad (29)$$

$$\alpha_{b3} = -\frac{\beta_{b2}}{2} \quad (30)$$

And, substituting in 28 from Equations 24, 25, 26, 27, 29, and 30 we obtain $$\theta_3 = D_{2,3}\left(C_3 + \frac{C_2}{2}\right) + D_{3,4}\left(C_3 + \frac{C_4}{2}\right) \quad (31)$$

Similarly, for the angle between the chords at the point 4

$$\theta_4 = D_{3,4}\left(C_4 + \frac{C_3}{2}\right) + D_{4,5}\left(C_4 + \frac{C_5}{2}\right) \quad (32)$$

and the values of $\beta_{a3}$ and $\alpha_{b4}$ required for use in Equations 1 and 2 for the same chord are seen to be given by $$\beta_{a3} = -D_{3,4}\frac{C_4}{2} \quad (33)$$

$$\alpha_{b4} = D_{3,4}\frac{C_3}{2} \quad (34)$$

In order to obtain the values of the constants of proportionality, C, for the chord 3, 4, it is necessary to set up the equations for $\theta_2$, $\theta_3$, $\theta_4$ and $\theta_5$, in simultaneous form, as follows:

$$\theta_2 = D_{1,2}C_2 + D_{2,3}\left(C_2 + \frac{C_3}{2}\right) \quad (35)$$

$$\theta_3 = D_{2,3}\left(C_3 + \frac{C_2}{2}\right) + D_{3,4}\left(C_3 + \frac{C_4}{2}\right) \quad (36)$$

$$\theta_4 = D_{3,4}\left(C_4 + \frac{C_3}{2}\right) + D_{4,5}\left(C_4 + \frac{C_5}{2}\right) \quad (37)$$

$$\theta_5 = D_{4,5}\left(C_5 + \frac{C_4}{2}\right) + D_{5,6}C_5 \quad (38)$$

Thus, information pertaining to all of the six points of constraint, is included in Equation 1 which is the ordinate of the curve between the points 3 and 4, referred to the chord as the X axis.

Equation 1 is derived from Equation 17 as follows:

$$H_a = \left(S - \frac{S^3}{D^2}\right)\beta_a$$

Referring to FIG. 3, $H_a$ is the departure from the chord of the curve (a) defined by $\beta_a$.

$$H_b = -\left[(D-S) - \frac{(D-S)^3}{D^2}\right]\alpha_b$$

where $H_b$ is the departure from the chord of the curve (b) defined by $\alpha_b$.

The resultant curve is $$H_a + H_b = (D^2S - S^3)\frac{\beta_a}{D^2} - (2D^2S - 3DS^2 + S^3)\frac{\alpha_b}{D^2}$$

The total offset $H_a + H_b$ is equal to $H$ $$H = S(D-S)(D+S)\frac{\beta_a}{D^2} - S(D-S)(2D-S)\frac{\alpha_b}{D^2}$$

$$= \frac{S(D-S)}{D}\left[\left(\frac{D+S}{D}\right)\beta_a - \left(\frac{2D-S}{D}\right)\alpha_b\right]$$

$$= \frac{S(D-S)}{D}\left[\left(1+\frac{S}{D}\right)\beta_a - \left(2-\frac{S}{D}\right)\alpha_b\right]$$

$$= \frac{S(D-S)}{D}\left[\beta_a - \alpha_b + \beta_a\left(\frac{S}{D}\right) - \alpha_b\left(1-\frac{S}{D}\right)\right]$$

which is identical with Equation 1.

Equation 2 is similarly derived from Equation 18.

$$\lambda_a = \left(1 - \frac{3S^2}{D^2}\right)\beta_a$$

where $\lambda_a$ is the slope of the curve $(a)$ and $$\lambda_b = \left(1 - \frac{3(D-S)^2}{D^2}\right)\alpha_b$$

The total angle $\lambda$ is equal to $\lambda_a + \lambda_b$ $$\lambda = \left(1 - \frac{3S^2}{D^2}\right)\beta_a + \left[1 - 3\left(1-\frac{S}{D}\right)^2\right]\alpha_b$$

which is equivalent to Equation 2.

Information for the curve to be reproduced may be given by (1) a table of the X and Y coordinates of the points through which the curve must pass, (2) a table of the X and Y coordinates and the slope of the curve at each point, (3) an equation of the required curve (or by a series of equations for various parts of the curve), and (4) an actual sample of the part to be reproduced, or a pattern of any suitable scale.

(1) If a table of the X and Y coordinates of the curve is given, no decision as to the points to be used needs to be made. The given points are used and the interpolation method described gives a smooth curve going through the points.

(2) If, in addition to the coordinates, the slope of the curve at each point is given, the values of the parameters alpha and beta can be determined very readily.

(3) If an equation is given, a decision must be made as to how close together the points must be. This can be determined mathematically. However, once the spacing of the points has been determined, the values of $\Delta X$ and $\Delta Y$ can be easily calculated from the equation and alpha and beta may be readily determined without using the interpolation method described.

(4) If a sample or pattern is supplied, the spacing of the points will have to be determined, but this can probably be done by inspection, perhaps with the aid of a spherometer. The coordinates of the chosen points can then be measured and fed to the digital computer.

*Determination of Coefficients for Equation 1 When Tangents to the Curve To Be Approximated Are Available From the Equation of That Curve, or Are Included in the Given Data*

From Equations 33 and 34, it follows immediately that the coefficients $\alpha_b$ and $\beta_a$ can be found when the angles $\alpha_{N+1}$ and $\beta_N$ are specified, by use of the following equations:

$$\alpha_b = -\frac{1}{3}(\alpha_{N+1} + 2\beta_N) \quad (39)$$

$$\beta_a = -\frac{1}{3}(2\alpha_{N+1} + \beta_N) \quad (40)$$

These equations, however, are based upon a derivation which assumed that angles were sufficiently small to be taken equal to their tangents, and the curve represented by Equation 1 will have the required initial and terminal slopes only if this assumption is valid.

However, if the coefficients $\alpha_b$ and $\beta_a$ are found by use of the following pair of equations, the initial and terminal slopes of the curve represented by Equation 1 will be exactly those desired.

$$\alpha_b = -\frac{1}{3}[\tan \alpha_{N+1} + 2 \tan \beta_N] \quad (41)$$

$$\beta_a = -\frac{1}{3}[2 \tan \alpha_{N+1} + \tan \beta_N] \quad (42)$$

This is easily demonstrated by evaluation of tan $\lambda$ (see Equation 2) with these values for $\alpha_b$ and $\beta_a$, for $S=O$ and $S=D$. It should be noted that $\alpha_b$ and $\beta_a$ are no longer actually angles if they are found by use of the second set of equations given above. When the equation of the curve is given, and if a digital computer has already been programmed to carry out the computation previously outlined, it may be preferable to use the equation of the curve to determine the $x$ and $y$ coordinates of a suitable number of points and to feed these points into the digital computer.

*Straight Line*

When any portion of the path to be generated is a straight line, the values of alpha and beta for segments along the straight line portion are zero and the values of $\Delta X$ and $\Delta Y$ can be computed on a desk calculator and hand-punched into tape 3' at the appropriate position along the tape.

*End Points*

As previously stated, the equations which have been developed for the parameters of the spline fit to each segment of the curve are based upon using the points defining two prior and two subsequent segments. For the first segment of the curve there are no prior segments, and for the second segment only one. Similarly, at the end of the curve, there are no subsequent segments for the last segment, and only one for the penultimate segment. Several methods of overcoming this difficulty are available and a preferred method will be described.

Where no additional data is given, the spline is assumed to be open-ended and to have zero curvature at end point.

The parameters of the first two and last two segments may be computed using Equations 35, 36, 37 and 38 to obtain a value for $C_2$ to be used in Equations 33 and 34 for the parameters of the first two segments, where $C_1$ is zero and remembering that $C_3$ is normally computed for use on the third segment. Similarly, a value for $C_5$ is obtained for computing the parameters of the last two segments, where $C_6$ is zero and remembering that $C_4$ is normally computed for the third segment from the end. Equations 33 and 34 rewritten with new subscripts for this computation are as follows:

| First Segment | Second Segment | Penultimate Segment | Last Segment | |
|---|---|---|---|---|
| $\beta_{a1} = -D_{1,2}\frac{C_2}{2}$ | $\beta_{a2} = -D_{2,3}\frac{C_3}{2}$ | $\beta_{a4} = -D_{4,5}\frac{C_5}{2}$ | $\beta_{a5} = -D_{5,6}\frac{C_6}{2}$ | (43) |
| $\alpha_{b2} = D_{1,2}\frac{C_1}{2}$ | $\alpha_{b3} = D_{2,3}\frac{C_2}{2}$ | $\alpha_{b5} = D_{4,5}\frac{C_4}{2}$ | $\alpha_{b6} = D_{5,6}\frac{C_5}{2}$ | (44) |

Since $C_1$ for the first two segments, and $C_6$ for the last two segments are zero, the angles $\alpha_{b2}$ and $\beta_{a5}$ are also zero. H and $\lambda$ for these initial and terminal segments are evaluated by Equations 1 and 2, using the appropriate values of $\alpha$ and $\beta$ as tabulated above.

For the case in which the tangent at one end of the spline is known, the following approach can be taken: If we examine the three-point beam of FIG. 4b, we see that by referring to Equation 21 we have: $\alpha/\beta = D_{1,2}/D_{2,3}$. As the distance $D_{1,2}$ is shortened, the angle $\alpha$ decreases. In the extreme, when $D_{1,2}=0$, $\alpha$ becomes zero and the tangent to the curve at point 2 lies along the chord $D_{1,2}$. If the direction of chord $D_{1,2}$ is chosen as the known tangent at the end of the spline, and if the coordinate increments between points 1 and 2 are chosen to be zero, this special case can be handled by the general method previously described.

Accuracy

The approximate spline fit interpolation herein discussed is based on the assumption that points remote from the curve segment under consideration have no effect on the shape of the segment. This not being strictly true, there will be some error in the interpolation. Another source of error is the assumption that angles are equal to their tangents and sines. By choosing coordinate points close enough together, however, a six point fit will provide sufficient interpolation accuracy for most problems. It is of course possible to use more than six (6) points to improve accuracy, and the system herein described is not limited in principle to six points. It is possible, however, to improve accuracy without using more points.

Error in Computation of $\alpha$ and $\beta$ and Method of Correction

At each of the specified points through which the generated curve is to pass, the angle $\theta_N$ between the chords should equal the sum of the chord-to-tangent angles $\alpha_N$ and $\beta_N$ at that point. The values of these angles in terms of the coefficients already computed may be obtained by solution of Equations 29, 30, 39 and 40, and are $$\alpha_N = -2\beta_{a_{N-1}} + \alpha_{b_N}, \quad \beta_N = -2\alpha_{b_{N+1}} + \beta_{a_N} \quad (45)$$

where N−1, N and N+1 identify any three consecutive points. If the sum of these two chord-to-tangent angles is not equal to the angle between chords, then the error $$\eta_N = \beta_N - \alpha_N + \theta_N \quad (46)$$

may be removed by computing, for each point, the adjusted angles $$\alpha'_N = \alpha_N \left(1 - \frac{\eta_N}{\beta_N - \alpha_N}\right), \quad \beta'_N = \beta_N \left(1 - \frac{\eta_N}{\beta_N - \alpha_N}\right) \quad (47)$$

The adjusted coefficients for use in Equations 1 and 2 are then computed from Equation 3.

The correction just described will assure smoothness of the generated curve if the angles involved are sufficiently small to be assumed equal to their tangents. If this assumption is not valid, the required smoothness may be attained by using the tangents of the angles in Equation 41 and 42, instead of the angles themselves, in Equations 39 and 40. These computations are programmed for and performed by the digital computer.

Tool Radius Correction Computer

Referring to FIG. 5, a curve connecting the points $X_1Y_1$ and $X_2Y_2$ is shown, the connecting chord having length D. If the cutter which is to be used for the cutting operation has a radius R, then its center should be at the point $X'Y'$, in order to cut tangent to the curve at the point $X_pY_p$. The components of the chord D in the machine coordinate system are $X_{1,2}$ and $\Delta Y_{1,2}$.

The instantaneous location of the cutter center is determined in the following way:

The machine coordinates of the cutter center for cutting tangent to a given instantaneous cutting point P, along the curve, are given by $$X' = X_p + X_R \quad (48)$$
$$Y' = Y_p + Y_R \quad (49)$$

where $X_p$ and $Y_p$ are the machine coordinates of the cutting point, and $X_R$ and $Y_R$ are the components in the machine coordinates of the cutter radius R.

$X_p$ and $Y_p$ may be expressed by the equations $$X_p = X_1 + S \cos \sigma - H \sin \sigma \quad (50)$$
$$Y_p = Y_1 + S \sin \sigma + H \cos \sigma \quad (51)$$

where $\sigma$ is the angle made by the chord D with the X-axis of the machine coordinate system. The values of $X_R$ and $Y_R$ are given by $$X_R = R \cos \phi \quad (52)$$
$$Y_R = R \sin \phi \quad (53)$$

The angle made by the tangent to the required curve with the direction of the chord is $\lambda$, and the slope of the required curve in the machine coordinate system is the sum of the angles $\lambda$ and $\sigma$. By the rule for the functions of the sum of two angles, we can write $$\sin \phi = \sin \sigma \cos \lambda + \cos \sigma \sin \lambda \quad (54)$$
$$\cos \phi = \cos \sigma \cos \lambda - \sin \sigma \sin \lambda \quad (55)$$

which may be written $$\sin \phi = \cos \lambda (\sin \sigma + \cos \sigma \tan \lambda) \quad (56)$$
$$\cos \phi = \cos \lambda (\cos \sigma - \sin \sigma \tan \lambda) \quad (57)$$

Now, by inspection of FIG. 5, it is seen that $$\sin \sigma = \frac{\Delta Y}{D} \quad (58)$$

$$\cos \sigma = \frac{\Delta X}{D} \quad (59)$$

and tan $\lambda$ is expressed in Equation 2.

Therefore the following expressions can be derived by substitution $$\sin \phi = \frac{\cos \lambda}{D}(\Delta Y + \Delta X \tan \lambda) \quad (60)$$

$$\cos \phi = \frac{\cos \lambda}{D}(\Delta X - \Delta Y \tan \lambda) \quad (61)$$

$$X' = X_1 + S\frac{\Delta X}{D} - H\frac{\Delta Y}{D} + X_R \quad (62)$$

$$Y' = Y_1 + S\frac{\Delta Y}{D} + H\frac{\Delta X}{D} + Y_R \quad (63)$$

Distance Between Points

Using the method and apparatus of the invention, the error between the curve generated by the machine and any given function will depend upon (1) the nature of the function, and (2) the separation between the chosen points. FIG. 23 is a graph showing the accuracy of the fit attainable in the case of a circular arc. In this figure, curves are presented for four different accuracies or tolerances, namely, .001″, .0005″, .0001″ and .00005″, between radius of curvature $r$, and distance between points D, both in inches. It can be shown that the maximum departure from a circular path is $$E = \frac{8r^2 - D^2}{4\sqrt{4r^2 - D^2}} - r \quad (64)$$

and FIG. 23 is a plot of this equation for the accuracies shown.

Application of Equations to the Machine Control System

In the following discussion, the application of the pertinent equations to the X-axis only is described; the application to the Y-axis being similar and clearly revealed in the accompanying diagrams.

List Indicating Figures of Drawings Wherein Reference Numbers Appear

| Ref. No. | Element | Figures |
|---|---|---|
| 1' | Tape | 10 |
| 2' | Digital computer | 10 |
| 3' | Tape | 10 |
| 4' | Tape reader | 11 |
| 5' | Distributor | 11 |
| 6' | Translator | 11 |
| 7 | Position data unit | 11 |
| 8 | do | 11 |
| 9 | do | 11 |
| 10 | Feed rate converter | 11 |
| 11 | Storage relays | 11 |
| 12 | Multipliers | 11 |
| 13 | Shaft | 14, 15, 18 |
| 14 | Wiper | 13 |
| 15 | Multiplier | a 12 |
| 16 | Summing resistors | 6a, 12 |
| 17 | do | 6a, 12 |
| 18 | Resolver | 6a, 12 |
| 19 | do | 7a, 12 |
| 20 | do | 8a, 12 |
| 21 | Servo motor | 6a, 12 |
| 22 | Amplifier | 6a, 12 |
| 23 | do | 12 |
| 24 | do | 12 |
| 26 | do | 12 |
| 27 | do | 12 |
| 28 | Potentiometer | 13, 18 |
| 29 | Amplifier | 13 |
| 30 | Potentiometer | 13, 18 |
| 31 | Amplifier | 13 |
| 32 | Potentiometer | 13, 18 |
| 33 | Resistor | 13 |
| 34 | Amplifier | 13 |
| 35 | Potentiometer | 13, 18 |
| 36 | Resistor | 13 |
| 37 | Shaft (input to 64) | 15, 18 |
| 38 | Stop and corner control | 11 |
| 41 | Gear mechanism, binary | 14, 18 |
| 42 | do | 14 |
| 43 | Feed motor (servo) | 15, 18 |
| 44 | Tachometer | 15, 18 |
| 45 | Shaft input | 14, 18 |
| 52 | Reading cam | 14, 18 |
| 53 | Switch | 14, 18 |
| 54 | Differential | 14, 18 |
| 55 | Servo motor | 15, 18 |
| 56 | Amplifier | 15 |
| 57 | Resolvers | 15, 18 |
| 58 | do | 15, 18 |
| 59 | do | 15, 18 |
| 60 | Gears | 15, 18 |
| 61 | Shaft output | 14, 15, 18 |
| 62 | do | 15 |
| 63 | Shaft | 15, 18 |
| 64 | Differential | 15, 18 |
| 65 | Servo Motor | 15, 18 |
| 66 | Gears | 15, 18 |
| 67 | Resolvers | 15, 18 |
| 68 | do | 15, 18 |
| 69 | do | 15, 18 |
| 70 | Potentiometer | 15, 18 |
| 71 | Shaft output | 15, 14 |
| 72 | Resolver | 16, 17 |
| 73 | Resolver, medium | 16, 17 |
| 74 | Resolver, coarse | 16, 17 |
| 75 | Motor | 16, 17 |
| 76 | do | 16, 17 |
| 77 | Amplifier | 16, 17 |
| 78 | Gear differential | 16, 17 |
| 79 | Inductosyn | 16, 17 |
| 80 | Stator | 16, 17 |
| 81 | Screw | 16, 17 |
| 82 | Nut | 16, 17 |
| 83 | Switch | 16, 17 |
| 85 | Potentiometer | 12 |
| 86 | Reversing switch | 12 |
| 90 | Potentiometer | 14, 18 |
| 91 | Limiter | 11 |
| 92 | Amplifier | 11 |
| 93a | Switches and contacts | 11 |
| 93b | do | 12 |
| 94 | Clutch-Brake | 14, 18 |
| 95 | Relay | 12 |
| 96 | Transformer | 22 |
| 97 | Primary winding | 22 |
| 98 | Secondary winding | 22 |
| 99 | Relays | 22 |
| 100 | Differential feed | 18, 20 |
| 101 | do | 18 |
| 102 | do | 18 |
| 103 | do | 18 |
| 104 | Differential | 18 |
| 105 | do | 18 |
| 106 | do | 18 |
| 107 | do | 18 |
| 108 | do | 18 |
| 109 | do | 18 |
| 110 | Differential binary | 18, 20 |
| 111 | do | 18 |
| 112 | do | 18 |
| 113 | do | 18 |
| 114 | do | 18 |
| 115 | do | 18 |
| 116 | do | 18 |
| 117 | do | 8 |
| 118 | do | 8 |
| 119 | Differential binary | 18 |
| 122 | Differential | 18, 20 |
| 123 | do | 18, 20 |
| 124 | Gear reduction | 14, 18 |
| 125 | do | 14, 18 |
| 126 | do | 14, 18 |
| 127 | do | 14, 18, 20 |
| 128 | Input gear | 14, 18, 20 |
| 129 | Spider gear | 18, 20 |
| 130 | Shaft | 20 |
| 131 | Planetary gear | 20 |
| 132 | do | 19, 20 |
| 133 | Gear | 19, 20, 21 |
| 134 | do | 18, 19, 20, 21 |
| 135 | do | 18, 19, 20, 21 |
| 136 | do | 20, 21 |
| 137 | Spider gear | 18, 20 |
| 138 | Gear (planetary) | 20 |
| 139 | do | 20 |
| 140 | Output gear | 18, 20 |
| 141 | Key | 20 |
| 142 | Detent | 18, 19, 20 |
| 143 | Arm | 19 |
| 144 | do | 19 |
| 145 | Shaft | 19 |
| 146 | do | 19 |
| 147 | Pin | 19 |
| 148 | do | 19 |
| 149 | Shaft | 19, 24 |
| 150 | Cam | 19 |
| 151 | Springs | 19 |
| 152 | do | 19 |
| 153 | Arm | 19 |
| 154 | do | 19 |
| 155 | Roller | 19 |
| 156 | do | 19 |
| 157 | Cam | 18, 19 |
| 158 | do | 18, 19 |
| 159 | Gears (pair of) | 19, 21 |
| 160 | Gear | 20 |
| 161 | Shaft (stationary) | 18, 20, 21 |
| 162 | Shaft | 18, 19, 20, 21 |
| 163 | Key | 20 |
| 164 | Spider | 18, 20, 24 |
| 165 | Planetary gear sets | 20 |
| 166 | do | 20 |
| 168 | Output gear | 18, 20 |
| 169 | Detent | 18, 20, 24 |
| 170 | Spider | 18, 20 |
| 171 | Planetary gear sets | 20 |
| 172 | do | 20 |
| 173 | Gear | 20 |
| 174 | Detent shoe | 20 |
| 175 | Shaft | 19 |
| 176 | Idler | 14, 18 |
| 177 | Gear | 14, 18 |
| 178 | Reduction gears | 18 |
| 179 | do | 18 |
| 180 | do | 18 |
| 181 | do | 18 |
| 182 | Magnetic brake | 18 |
| 183 | Gears | 18 |
| 184 | do | 18 |
| 185 | Notch | 19, 20 |
| 185' | do | 20, 24 |
| 186 | do | 19, 20 |
| 186' | do | 20, 24 |
| 187 | Arm | 19, 21 |
| 188 | Gear | 18, 20 |
| 189 | Lines | 12 |
| 190 | do | 12 |
| 191 | do | 12 |
| 192 | Resolver shaft | 12 |
| 193 | Line | 12 |
| 194 | Reference voltage | 12 |
| 195 | Grounded tap | 13 |
| 196 | Shaft | 14, 18 |
| 197 | Gear | 14 |
| 198 | Idler | 14 |
| 199 | Gear | 14 |
| 200a | Relay and contact | 13 |
| 200b | do | 13 |
| 201 | Arm | 24 |
| 202 | Transformer | 13 |
| 203 | Resistor | 13 |
| 204 | do | 13 |
| 205 | do | 13 |
| 206 | do | 13 |
| 207 | do | 13 |
| 208 | do | 13 |
| 209 | do | 13 |
| 210 | do | 13 |
| 211 | Cam | 13 |
| 212 | Contact | 13, 18 |
| 213 | Solenoid | 19 |
| 214 | Relay | 12 |
| 215 | Sequence control | 14 |
| 216 | Shaft | 21 |
| 217 | Magnetic brake | 18 |
| 218 | Shaft | 15 |
| 219 | Position measuring transformer | 16 |
| 220 | Nut | 16 |
| 221 | Output | 22 |
| 222 | Reference Voltage | 11 |
| 223 | do | 12 |
| 224 | Servo motor | 15 |
| 225 | Gears | 16, 17 |
| 226 | Differential | 15 |
| 251 | Transformer | 13 |

*List Indicating Figures of Drawings Wherein Reference Numbers Appear*—Continued

| Ref. No. | Element | Figures |
|---|---|---|
| 295 | Conductor | 10, 11 |
| 300 | ----do---- | 11 to 14 |
| 301 | ----do---- | 11, 12 |
| 302 | ----do---- | 11, 12, 13, 14 |
| 303 | ----do---- | 11 to 15 |
| 304 | ----do---- | 11, 12, 13 |
| 305 | ----do---- | 11, 12, 13 |
| 306 | ----do---- | 11, 12 |
| 307 | ----do---- | 11, 12 |
| 308 | ----do---- | 11, 12 |
| 309 | ----do---- | 11 to 15 |
| 310 | ----do---- | 11 to 14 |
| 311 | ----do---- | 11 to 16 |
| 312 | ----do---- | 12, 13, 14 |
| 313 | ----do---- | 12 to 15 |
| 314 | ----do---- | 12 to 15 |
| 315 | ----do---- | 12 to 15 |
| 316 | ----do---- | 12 to 15 |
| 317 | ----do---- | 12 to 15 |
| 318 | ----do---- | 12, 13 |
| 319 | ----do---- | 12, 13 |
| 320 | ----do---- | 12, 13, 14 |
| 321 | ----do---- | 12 to 15 |
| 322 | ----do---- | 12 to 15 |
| 323 | ----do---- | 13, 14 |
| 324 | ----do---- | 13, 14 |
| 325 | Shaft | 14, 15 |
| 326 | ----do---- | 14, 15 |
| 327 | Conductor | 15, 16, 17 |
| 328 | ----do---- | 15, 16, 17 |
| 329 | ----do---- | 15, 16, 17 |
| 330 | ----do---- | 15, 16, 17 |
| 331 | ----do---- | 15, 16, 17 |
| 332 | ----do---- | 15, 16 |
| 333 | ----do---- | 15, 16 |
| 334 | ----do---- | 15, 16 |
| 335 | ----do---- | 15, 16 |
| 336 | ----do---- | 15, 16 |
| 337 | ----do---- | 15, 16 |
| 338 | ----do---- | 15, 16, 17 |
| 339 | ----do---- | 16, 17 |
| 340 | ----do---- | 16, 17 |

Figure 15:
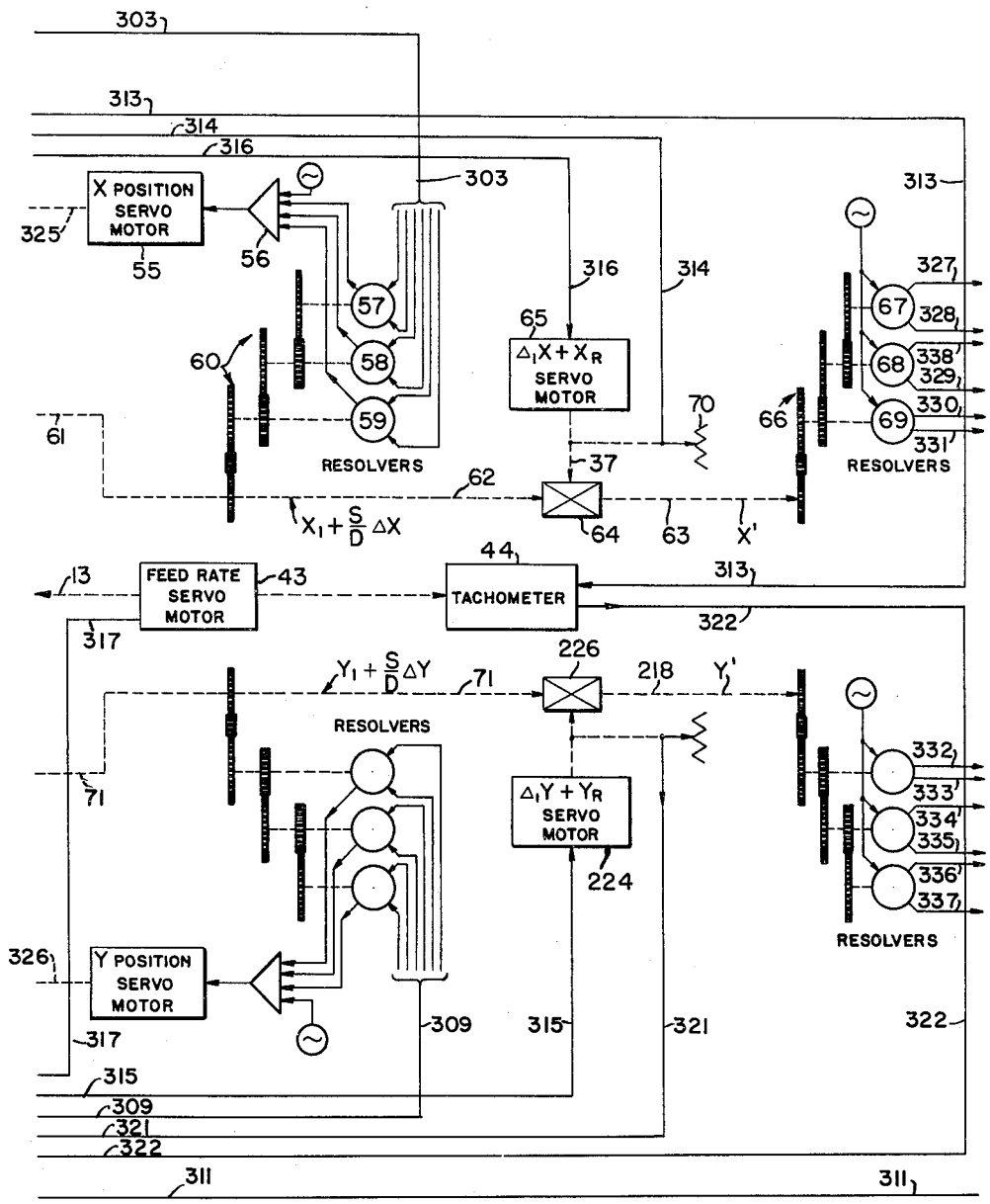

The output of shaft 63, FIG. 15, represents the instantaneous position of the X-coordinate of the cutter center, and therefore represents the value of X as given by Equation 62. Two inputs determine the position of this shaft 63: the first input is from shaft 62 which is controlled by the X position servomotor 55 acting through 2 to 1 speedup gears 183, 184 and differential 54, the second input being from servomotor 65 acting through shaft 37, these two shaft inputs 37 and 62 acting additively through the differential 64 to operate shaft 63 in accordance with the sum of these two inputs. The sum of these two inputs from shafts 37 and 62 is represented by Equation 62, the first input being the sum of the first and second terms of the equation, $$X_1 + S\frac{\Delta X}{D}$$

the second input being the sum of the last two terms of this equation, $$-H\frac{\Delta Y}{D} + Y_R$$

The manner in which these two inputs are made to conform to the appropriate terms of the Equation 62 is explained below.

The first input, $$X_1 + S\frac{\Delta X}{D}$$

is introduced by the gear mechanism 41, FIG. 14, which operates in a manner to be described later, so that the instantaneous position of output shaft 61 from gear 41 represents the X-coordinate, in the machine coordinate system, of the point on the chord at the foot of the perpendicular to the chord through the cutting point. The servomotor 55, amplifier 56, and resolvers 57, 58 and 59 are included as shown for the purpose of establishing an initial point X for the start of a curvilinear cut, for the purpose of controlling the machine by means of position inputs only.

The second input, $$-H\frac{\Delta Y}{D} + X_R$$

is introduced by the servomotor 65 through differential 64 in response to a signal from amplifier 26, FIG. 12. The inputs to the amplifier 26 are $X_R$ on line 189, FIG. 12 shown as an output of resolver 20, whereas $\Delta_1 X$ is shown in FIG. 12 as an output on line 190 from one of the multipliers indicated at 15, another input being a feedback signal on line 191 from a potentiometer 70, FIG. 15. Potentiometer 70 is geared to the servomotor 65, and develops a feedback signal such that the output of amplifier 26 becomes zero when the shaft position of the input to differential 64 corresponds to the sum of the inputs $X_R + \Delta_1 X$, to the amplifier 26.

The sum of inputs to amplifier 26, $X_R + \Delta_1 X$, represents the sum of the last two terms of Equation 62, where $$\Delta_1 X = \Delta Y \frac{H}{D}$$

The value $X_R$ is an output of the resolver 20, FIG. 12 when the input to that resolver is the cutter radius R, shown in FIG. 12 as being developed by a manually controlled potentiometer 85, and a mechanical rotary input equal to the slope angle $\phi$ of the required curve with respect to the machine coordinate axes, being the sum of the angles $\lambda$ and $\sigma$ as shown in FIG. 5 and discussed in connection with Equations 52 and 53. A reversing switch 86 is included in the input circuit to resolver 20 in order to provide for both positive and negative cutter radius correction.

The mechanical shaft angle $\phi$ is developed by servomotor 21, FIG. 12 operating from amplifier 22 and resolver 18. FIGS. 6a and 6b described the geometry and the resolver method of solution for the development of the shaft angle $\phi$. When the inputs to resolver 18 are proportional to the sine and the cosine of the required angle $\phi$, one of the outputs of this resolver will be zero when the shaft position of said resolver corresponds to the angle $\phi$. This output is led to amplifier 22 and the output of amplifier 22 is led to the servomotor 21, so that, when the output of resolver 18 is not zero, the servomotor 21 is caused to operate in such a direction that the position of the resolver shaft 192 will approach the angle $\phi$ and the output of the resolver 18 will approach zero. The value of the other output of the resolver 18, which also varies with the position of shaft 192, is such as to provide an effective gain control for the servo loop, and is indicated at line 193 as being so used. The inputs to resolver 18, which are proportional to the sine and the cosine of the angle $\phi$, correspond to Equation 60 and 61. These values are developed in the multipliers 15 and summing resistors 16 and 17, FIG. 12, the product of $\Delta Y$ times a reference voltage being summed with $\Delta X$ times the input tan $\lambda$ at 16, and $\Delta X$ times a reference voltage 194 being summed with $\Delta Y$ times tan $\lambda$ at summing resistor 17. The input tan $\lambda$ is developed at amplifier 23, FIG. 12, in a manner to be described later.

Resolver 19 is also mounted on the shaft 192 representing the slope angle $\phi$, with inputs $\Delta Y$ and $\Delta X$, so that the output of this resolver represents the value of the length D of the chord. This value is fed to tachometer 44, FIG. 15 in such a way that the speed of the feed rate servomotor 43 will be inversely proportional to the length D of the chord. The tachometer 44 is a form of commercial induction generator using A.C. excitation and its output voltage at the input frequency is proportional to the product of the excitation voltage and speed.

The input $\Delta_1 X$ to amplifier 26, is an output of one of the multipliers 15, and represents the product of $\Delta Y$ and the input $H/D$, which is developed as the output of amplifier 24, FIG. 12, in a manner to be described later. The relationship can be seen by inspection of FIG. 5.

The values of $\beta$ and $\alpha$ at each point along the curve, are computed in the digital computer 2', FIG. 10, in accordance with equations of the form of (33) and (34), and the values required in these equations of the proportionality constants C, are also computed in the digital computer 2' in accordance with equations of the form of (35), (36), (37) and (38).

*Evaluation of Equations 1 and 2 by Interpolation Circuits*

Figure 11:
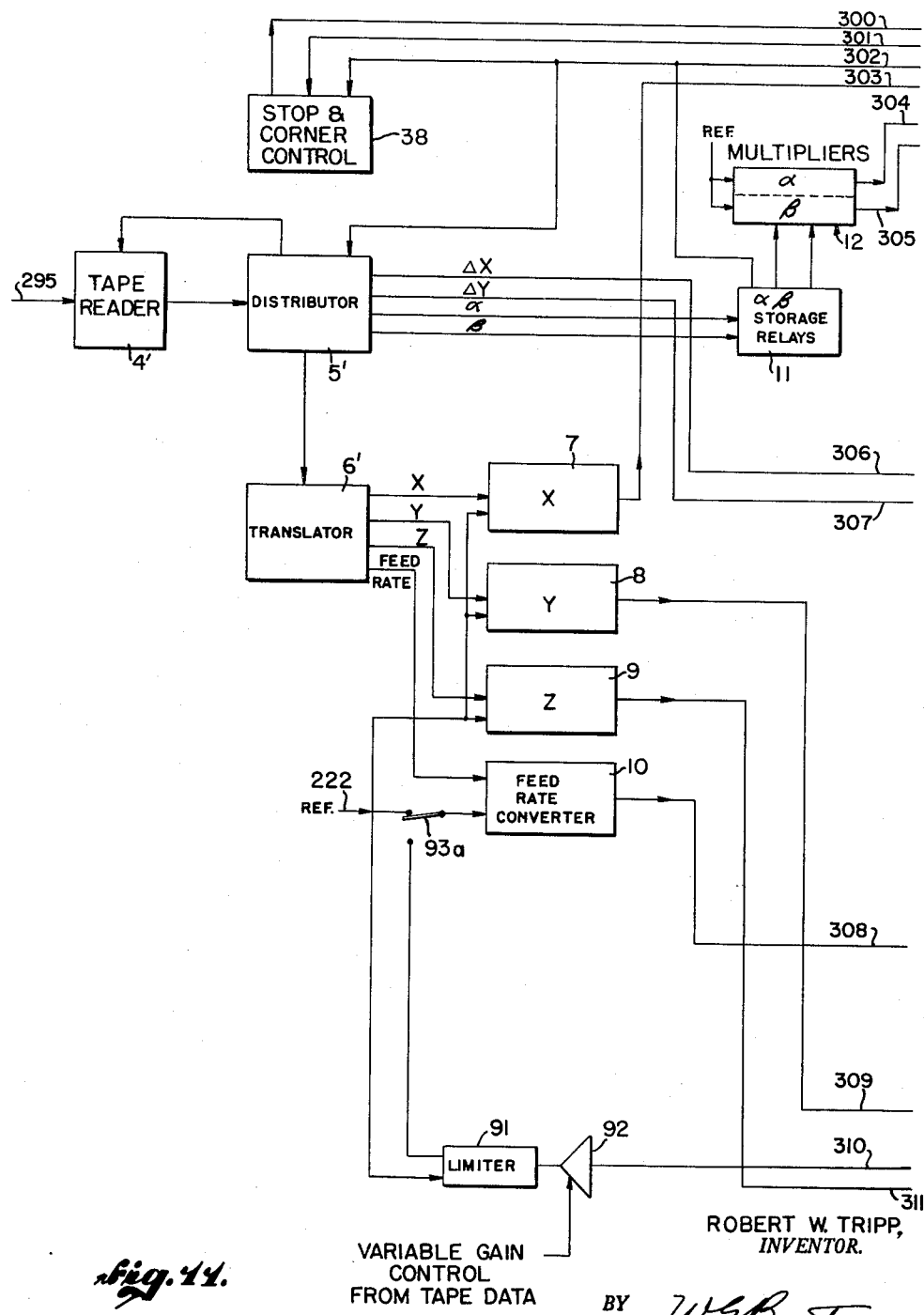
Figure 42:
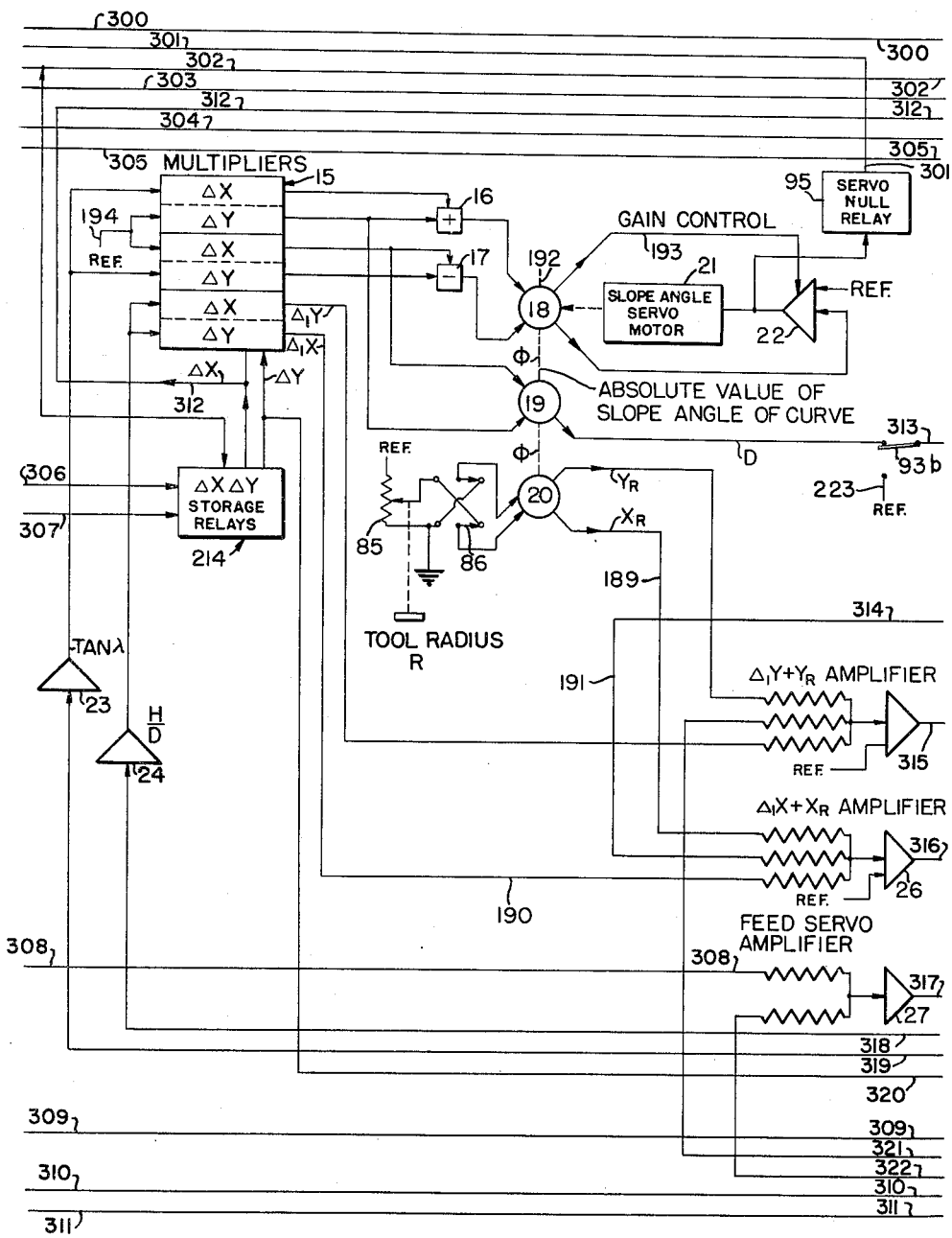

The Equations 1 and 2 are evaluated by the interpolation circuits now to be described as follows:

The digital values of $\beta_a$ and $\alpha_b$, which will now be designated simply by $\beta$ and $\alpha$, are converted into analog voltages by the multipliers 12, FIG. 11, which are shown in detail in FIG. 22. The $\beta$ and $\alpha$ voltages from multipliers 12 are the inputs to amplifiers 31 and 34, FIG. 13. These amplifiers are of the current feedback type, consequently the currents in the outputs are proportional to $\beta$ and $\alpha$.

Figure 13:
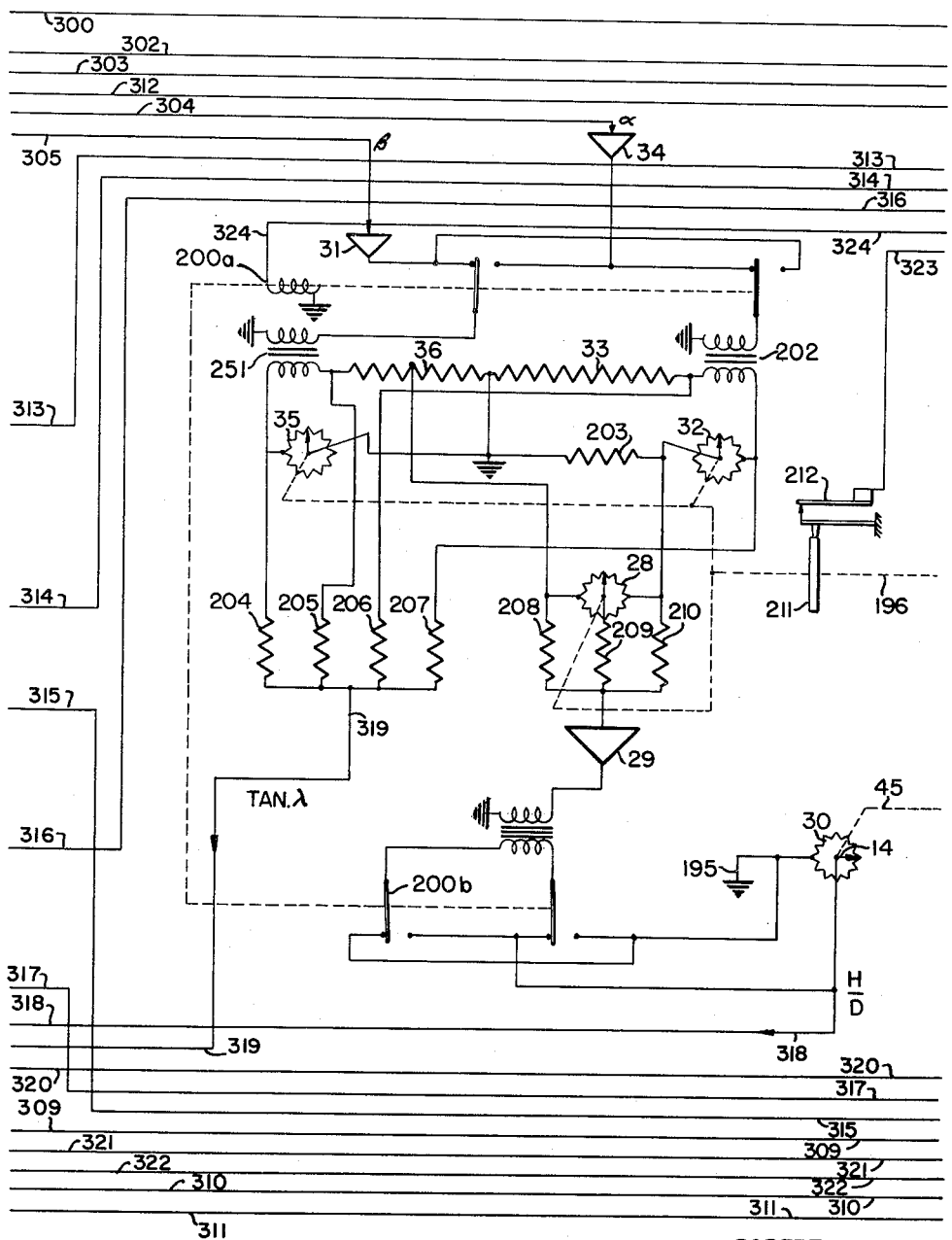
Figure 14:
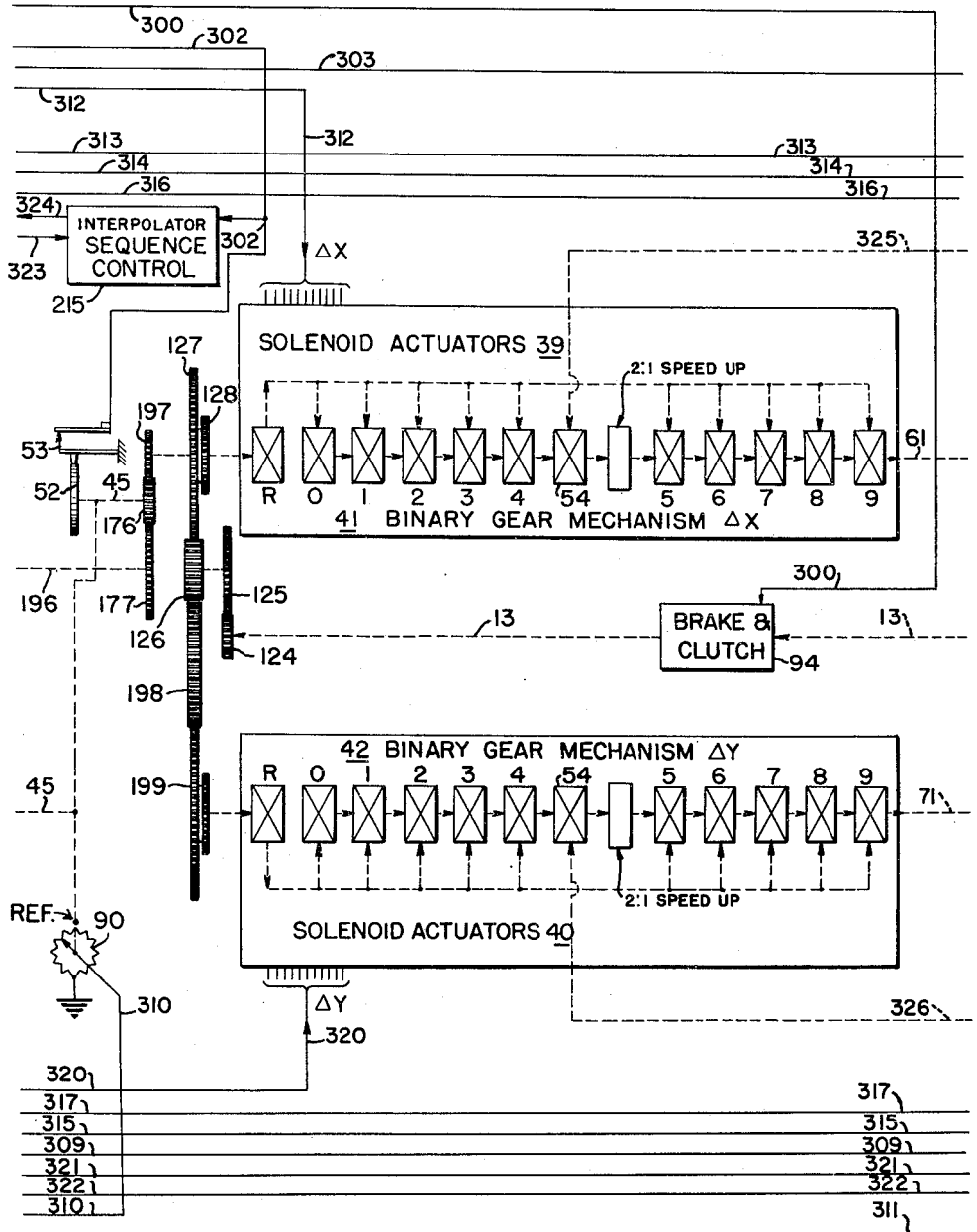

With relay 200a in its alternate position, the current in the secondary of transformer 202, FIG. 13, flows through resistor 33, resistor 203 and linear potentiometer 32 which is driven by shaft 196 and makes one-half revolution for one revolution of shaft 45, FIG. 14 which corresponds to the chord length D. Shaft 45 is driven by the feed rate servomotor 43, FIG. 15, as explained later in connection with the gear ratio mechanism.

If the wiper of potentiometer 32, which has a total resistance of $Rp$ is at the midpoint (opposite the connection of the winding) when S, the distance measured along the chord, is zero, the effective resistance is $$Rp\left(\frac{1}{2}+\frac{S}{2D}\right)\left(\frac{1}{2}-\frac{S}{2D}\right)=\frac{Rp}{4}\left(1-\frac{S^2}{D^2}\right)$$

Let $Ro$ equal the resistance across which the current from transformer 202 will develop the voltage $\beta$.

Then, if $Rp=12Ro$, the voltage across potentiometer 32 will be $$\beta\left(3-\frac{3S^2}{D^2}\right)$$

If resistor 33 has a resistance of $2Ro$, the voltage developed across it will be equal to $2\beta$ and of opposite polarity to the voltage across potentiometer 32. These voltages are summed by equal resistors 206 and 207 at the input of summing amplifier 23 to produce the term $$\beta\left(1-\frac{3S^2}{D^2}\right)$$

of Equation 2. For the above discussion, resistor 203 is assumed to be zero. Its use is discussed in connection with Equation 1.

Since the wiper of potentiometer 35 is displaced 180° from that of potentiometer 32, its resistance is equal to $$\frac{Rp}{4}\left[1-\frac{(1-S)^2}{D^2}\right]$$

thus producing the term $$\alpha\left[1-3\left(1-\frac{S}{D}\right)^2\right]$$

at the input to amplifier 23 through resistors 204 and 205, relay 200a being at its alternate position, thus supplying $\alpha$ to the primary winding of transformer 251.

Thus the output of amplifier 23 is the desired value $$\lambda=\beta\left(1-\frac{3S^2}{D^2}\right)+\alpha\left[1-3\left(1-\frac{S}{D}\right)^2\right]$$

Equation 1, $$H=\left[\beta-\alpha+\beta\left(\frac{S}{D}\right)-\alpha\left(1-\frac{S}{D}\right)\right]\frac{S(D-S)}{D}$$

is evaluated by the interpolation mechanism as follows:

Resistor 36, FIG. 13, is tapped at its midpoint to give the voltage $-\alpha$. A resistor 203 of value $Ro$ is inserted between potentiometer 32 and ground. The voltage across this resistor is $\beta$. The linear potentiometer 28 which is connected between these points and driven by shaft 196 at one-half revolution for one revolution of shaft 45 has an output voltage at its swinger of $$\beta\left(\frac{S}{D}\right)-\alpha\left(1-\frac{S}{D}\right)$$

This voltage and the $-\alpha$ and $+\beta$ voltages are added by resistors 208, 209, 210 at the input of summing amplifier 29. This amplifier is of the current feedback type and consequently the output current is equal to $$\left[\beta-\alpha+\beta\left(\frac{S}{D}\right)-\alpha\left(1-\frac{S}{D}\right)\right]$$

Linear potentiometer 30 is driven at the same speed as shaft 45 and has its swinger at the grounded tap 195 when $S=D$, i.e., when the distance measured along the chord is zero or D.

The effective resistance of this potentiometer 30 is $$\frac{S(D-S)}{D^2}$$

consequently the voltage appearing at the swinger of the potentiometer 30 is $$\left[\beta-\alpha+\beta\left(\frac{S}{D}\right)-\alpha\left(1-\frac{S}{D}\right)\right]\frac{S(D-S)}{D^2}=\frac{H}{D}$$

Since resistor 203 has been added to the circuit used to evaluate Equation 2, the value of resistor 33 is increased by the same amount to a value of $3Ro$. The resistance of potentiometer 28 is not critical since its net effect on the circuit used for Equation 2 is zero.

Since $$\Delta X = D \cos \sigma$$

and $$\Delta Y = D \sin \sigma$$

the multiplication of H/D by these values in multiplier 15 results respectively in the desired values of $$\Delta_1 Y = H \cos \sigma$$

and $$\Delta_1 X = H \sin \sigma$$

Since potentiometers 28, 32, 35 are driven by shaft 196 and make one half revolution per revolution of shaft 45, relay 200a is provided which alternately connects the $\beta$ and $\alpha$ supply from multipliers 12, FIG. 11, either directly as shown in FIG. 13 or interchanged. The position of the relay 200a is determined by contact 212 operated by cam 211, and its time of operation is determined by switch 53. Cam 211 and potentiometers 28, 32 and 35 are driven by shaft 196 which is driven through the 2 to 1 gear ratio 197, 177, gear 197 being driven with gear 127 at the feed rate input to the $\Delta X$ binary gear mechanism 41. Switch 53 is operated by cam 52, FIG. 14, on the feed rate drive shaft 45. This reversal avoids the necessity of having the sliders of potentiometers 28, 32 and 35 step back to the starting points when the end of the segment like 1, 2 in FIG. 2 has been reached and a new one is to be started. The interpolator sequence control 215 combines these switching operations to activate relay 200a.

The interchange of $\alpha$ and $\beta$ causes a reversal of polarity into amplifier 29 which is connected by contact 200b on relay 200a and shown near the bottom of FIG. 13.

*Description of the System of FIGS. 10 to 16*

Figure 16:
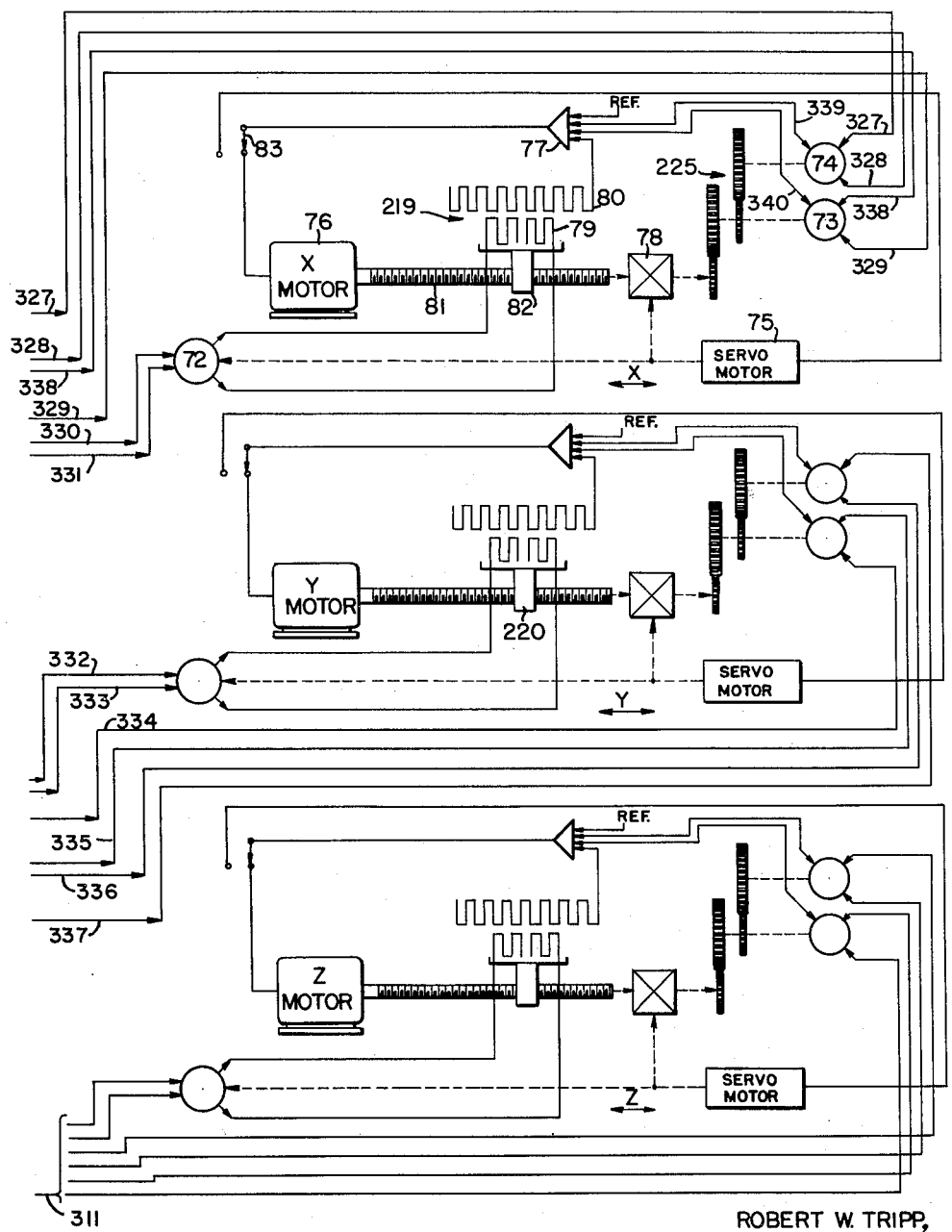

FIG. 9 shows how FIGS. 10 to 16 are arranged side-by-side, providing a diagram of the contouring machine control system. The complete control system from the numerical input on tape 3' in FIG. 10 to the machine elements in FIG. 16 is depicted. In FIGS. 12 to 16 inclusive, dash lines represent mechanical drives. Referring particularly to FIG. 16, resolves 72, 73 and 74, motors 75 and 76, differential gears 78, Inductosyn 79—80, lead screw 81 and nut 82, and gear 225, and similar components in the Y axis and Z axis drives, are normally mounted upon the controlled machine. The remaining electrical, electronic and mechanical components comprising the structure of the invention may be conveniently mounted in a control console.

The tape 1' represents the numerical input to the digital computer 2' and may be in either the form of perforated tape or other numerical input. Some digital computers 2' use a typewriter keyboard for numerical input, and others use a simple numerical keyboard. The digital computer 2' accepts the numerical information of the successive points along the curve to be generated and computes from this data the data required for the control equipment. In the digital computer, the successive coordinates of the points are subtracted to obtain the distances $\Delta X$, $\Delta Y$ along each axis from one point to the next. The quantities alpha and beta are also computed. The equations used for this computation have already been described.

It is entirely possible and in some cases practical to use hand methods to compute these constants. In any case, the machine shown will function most advantageously when a tape 3' is produced with this information proper coded upon it. For curve generating, the tape 3' will contain information of $\Delta X$, $\Delta Y$, $\alpha$ and $\beta$. When checking is desired or straight positioning is to be used, the coordinates X, Y and Z are used. Feed rate is inserted on the tape if desired, but may be inserted at the machine by the machine operator if desired.

The tape 3' is read in the tape reader 4' which makes electrical contacts corresponding to the holes in the tape as it is fed through the tape reader 4'. This resulting electrical voltages are used to control the machine equipment through the distributor 5', which recognizes the codes on the tape and switches the corresponding electrical contacts to the correct portion of the machine control equipment. The data $\Delta X$, $\Delta Y$ and the interpolation constants $\alpha$ and $\beta$ are preferably coded in the tape in binary form. This facilitates reading this information between each pair of points and having it ready in the corresponding relay storage units 11, FIG. 11 and 214, FIG. 12, when needed.

Position information and feed rate information are preferably coded in binary decimal form, and in this case it is routed by the distributor 5' to the translator 6' which converts the binary-decimal to straight decimal. The translator 6' then further distributes this information to the corresponding position data units 7, 8 and 9. These units may advantageously be digital-to-analog converters of the type described in patent application 540,429, filed October 17, 1955 by Robert W. Tripp for Automatic Machine Control and assigned to the assignee of the present application, now Patent 2,849,668 dated August 26, 1958.

The storage relays 11 hold the computed $\alpha$ and $\beta$ information read in by the tape reader 4' and distributor 5' until it is required. When this information is required, it is transferred into the linear digital-to-analog converter and multiplier 12 which supplies output voltages used to control the various machine motions, as will be described presently.

Similarly the $\Delta X$ and $\Delta Y$ information is stored in relays 214. The reading cam 52 FIG. 14, and the switch 53 are used to transfer this data in at the proper times, and to cause the tape reader 4' to advance and read new data into the storage relays 11 and 214, while the machine is using the old data. The multiplier unit 15 is a set of 6 digital-to-analog converter transformer sets used as multipliers of the inputs indicated. These outputs are mixed as shown at 16 and 17 and applied to the resolver 18 to generate a shaft angle equal to the slope angle $\phi$ of the curve to be generated. This angle is obtained by servoing the resolver 18 until the voltage applied to the amplifier 22 is zero. The input voltage to the resolver 18 depends on the distance between successive points along the curve. (Such as points 1 and 2, FIG. 2). Therefore, the loop gain of the servo formed by the resolver 18, amplifier 22 and slope angle servomotor 21 must be controlled for proper servo response. This is done by using the other output of the resolver 18 to control the gain of the amplifier 22, making it approximately inversely proportional to the output of the resolver 18.

Resolver 18 positions resolvers 19 and 20 as indicated by the shaft 192.

The resolver 19 together with the tachometer 44 is used to control the rate of the feed servomotor 43 to maintain an approximately constant cutting rate independent of the length of each successive line segment of the curve to be cut. Details of this circuit are described later.

The resolver 20 is used to introduce cutter offset information into the machine control. This resolver is excited by a voltage from potentiometer 85 proportional to the radius of the cutter to be used. The reversing switch 86 permits either positive or negative radii to be used. The sine and cosine outputs of the resolver 20 are proportional to the X component and the Y component of the cutter radius. Since the shaft of the slope angle servomotor 21 is always at the slope angle $\phi$ of the curve, the cutter radius corections are always the required values. FIGS. 6a to 8b show the geometry applying to resolvers 18, 19 and 20 respectively.

*Method of Generating Curve*

The generation of a curve is based on generating chords connecting the successive given points and then computing continuously in analog form the perpendicular distance from the chord to the desired curve using the interpolation constants $\alpha$ and $\beta$. This distance is resolved into its X and Y components by the $\Delta X$, and $\Delta Y$ multipliers 15, FIG. 12. To these quantities are then added the components of the offset for the cutter radius. The result is the required path for the cutter center to maintain the face of the cutter substatnially tangent to the desired curve.

The chord of the curve is obtained by the use of the two gear ratio units 41 and 42 shown schematically in FIG. 14 and in further detail in FIGS. 18 to 21 and 24. These units are basically described and claimed in Case 3. An important difference here is the arrangement through the cam 52 to drive the shaft 45 one revolution and the shaft on which gears 127, 128 and 197 are mounted by one or an integral number of revolutions for each cycle of operation and to permit changes in ratio only at the ends of the cycles. This results in the output shaft 61 for the X axis and the corresponding shaft 71 for the Y axis making a number of revolutions or parts of revolutions proportional to the input number. Thus the angular travel added to the positions of the two output shafts 62 (for X) and 71 (for Y), FIG. 15, is proportional to the distance along the X and Y axes respectively required to generate the chord to the curve. Transfer of the data from the storage relays 214 into the gear ratio units 41 and 42 is accomplished accurately at the end of the cycle, without any pause in the motion of the output shafts 62 and 71.

The potentiometer 30 is driven by the input shaft 13 of the gear ratio system through gears 124, 125, 126, 127, 197 and 176 and shaft 45 is arranged to make one revolution for one cycle of the binary gear ratio equipment 41, 42. This potentiometer 30 is used in the analog computing equipment in a manner to be described later.

Similarly, the potentiometers 28, 32 and 35 are driven by the shaft 196 through the gears 197, 176 and 177 so that they make ½ revolution for each cycle of the input to the gear ratio units 41 and 42. These potentiometers 28, 32 and 35 are also used for portions of the computation previously described. The feedback amplifiers 29, 31, 34, FIG. 13, and 23, 24, FIG. 12, are used as isolating amplifiers and mixing amplifiers for the various signals required in the analog computation. Amplifiers 29, 31, and 34 are of the current feedback type.

From the outputs of the gear ratio units 41 and 42, the equipment is the same for both the X and Y axes. Therefore, only the equipment for the X axis is completely numbered and it alone is described in detail.

The output shaft 62 rotates by the amount equal to that required on the X axis to make the machine move along the chord to the curve.

Since the machine may be required to generate a curve at any point within its capacity, position is added to the information generated by the analog computer equipment. This is accompuished by the differential 54 embodied in the gear mechanism and illustrated in FIGS. 14 and 18. Differential 54 is driven by the servomotor 55. The resulting position of the output shaft 62 is determined by the resolvers 59, 58, and 57, FIG. 15. These resolvers are geared to each other to correspond to 0.1 inch per revolution, 10 inches per revolution, and 100, 400, or 1000 inches per revolution respectively, by the gears 60. The position is obtained by use of the electronic amplifier system 56 and the servomotor 55. This positioning is accomplished before starting the gear ratio equipment 41, 42 giving the machine the required input information as a starting point. After this is accomplished the servomotor 55 is turned off and not used again until the next pure positioning operation or set up procedure.

*The offset from the chord.*—The shaft 62 then starts at an angle corresponding to the starting position of the part to be cut, and proceeds in such a way that it corresponds to the required successive X positions for generating the chords of the curve segments to be cut. Similarly, the corresponding shaft 71 for the Y equipment does the same thing for the Y axis. With no further correction, the machine would describe a series of straight lines corresponding to the chords.

The analog equivalent of the X component of H, corresponding to the curve shape as represented by voltage in line 190 and the X component of the cutter offset as represented by voltage in line 189, FIG. 12, are added to the shaft 62 by means of the differential 64 by comparing the output of the analog computation in lines 189 and 190 with the voltage from the potentiometer 70 and driving the potentiometer 70 by the motor 65 until the output of the amplifier 26 is zero. When this condition has been reached, the shaft of the motor 65 has rotated an angle proportional to the sum of the curve computation and the cutter offset computation. Thus the output shaft 63 from differential 64 now represents the desired position of the center of the cutter along the X axis. The corresponding shaft 218 (FIG. 15) for the Y axis has received the similar computations and rotations corresponding to the Y component of the curve to be cut.

The shaft 63 drives the coarse, medium and fine data elements, or resolvers 67, 68, and 69 through the gears 66. The analog output of these resolvers 67 to 69 determines the position of the machine from moment to moment. However, the zero of the machine coordinate system may be different from that in which the part was dimensioned. Therefore, as shown in FIGS. 16 and 17, a zero offset is incorporated to make up the difference between the machine zero and the zero of the coordinate system in which the part was dimensioned. The difference in the fine data is obtained electrically by the resolver 72 driven by the servomotor 75. The differences of the coarse and medium data are obtained mechanically by the gear differential 78, acting through gears 225.

The data elements on the machine are the position measuring transformer 219 having scale 80 and slider 79 and the coarse and medium resolvers 73 and 74. The nut 82 represents the tool slide or other machine element to be positioned in accordance with the X component of the cutter center path. Similarly, the nut 220 represents the corresponding machine element to be positioned in accordance with the Y component of the cutter center path.

Zeroing of the zero offset equipment is accomplished by setting the switch 83, FIG. 16 to the left position, allowing the amplifier 77 to drive the servomotor 75, fine resolver 72, and the medium and coarse resolvers 73 and 74 through the gear differential 78, until all three of the output error signals are equal to zero. This operation is initiated after the machine is in the desired position for the numerical input being used, i.e., the cordinate system in which the part is dimensioned, as mentioned above.

Normal operation of the machine following the commands of the analog computer is obtained by leaving the switch 83 in the right-hand position, driving the motor 76 which in turn drives the screw 81. This results in a motion of the slider 79 relative to the stator scale 80, because the nut 82 is engaged with the screw 81. Also the coarse and medium data resolvers 73 and 74 are driven by the screw 81 through the differential 78, but the fine resolver 72 does not rotatae because it is controlled by a non-reversible drive from the servomotor 75. This zero offset feature is described and claimed in co-pending application Ser. No. 638,722, now Patent No. 2,950,427, referred to above.

*Position Measuring Transformer*

The invention provides for positioning or moving the linear machine drives with great accuracy. In the embodiment to be described, this is accomplished by employing linear position measuring transformers as the fine data elements in servo systems controlled by these data elements. The coarse data element may be a conventional two-pole resolver or it may be a position measuring transformer of the type described and claimed in patent application Ser. No. 536,464, filed Sept. 26, 1955 by R. W. Tripp, now Patent 2,900,612 dated August 18, 1959 the fine data element being preferably a position measuring transformer of the type described in patent application S. N. 509,168, filed May 18, 1955, by R. W. Tripp and J. L. Winget, now Patent 2,799,835 patented July 16, 1957 both cases being assigned to the assignee of the present application.

Such a position measuring transformer used as a fine data element is indicated at 79 and 80 in FIG. 16 and may comprise two inductively related metallic conductor patterns on glass members movable with respect to each other, one fastened to each of the machine elements whose relative positions or motions are to be controlled. One member bears a continuous winding in the form of a multiplicity of conductors disposed in a plane parallel to the direction of relative motion of the members, the conductors extending transversely of that direction. The conductors are connected into a single series circuit so that adjacent portions carry current in opposite directions transversely of the length of the array. The second member bears two windings similar to the winding of the first member but usually shorter and disposed with respect to each other in space quadrature of the cycle defined on the continuous winding of the first member by the separation, center to center, of three adjacent conductors of that winding, the separation being taken in the direction of relative motion of the two members. The members are supported for relative motion with their windings at a small and constant separation, and the design of the windings is preferably such that the voltage induced in any of them by a current in a winding of the other member is a substantially sinusoidal function of the relative position of the members, cyclical in a change of relation position of the members equal to this pole cycle.

Position measuring transformers such as 219 in FIG. 16 are similar in action to a resolver, but have a larger number of poles. The pole spacing may be one-tenth inch which corresponds to 360 electrical degrees. Experience indicates that it is possible to control positioning to an electrical angle of one milli-radian (on a 54-pole rotary tarnsformer, one milli-radian is equivalent to four seconds of arc); the positioning control of the linear transformer is therefore 1/6280 of one-tenth inch, or approximately 16 microinches. The realizable accuracy of linear transformers of this type is of the order of one ten-thousandth of an inch.

*Gear Ratio Mechanism, FIGS. 13, 14, 18 to 21 and 24*

FIGS. 18 to 21 and 24 show the arrangement of the gear ratio mechanism 41 and 42 of FIG. 14. Feed rate motor 43, FIGS. 15 and 18, drives shaft 13 and reduction gears 124, 125, 126. Gear 126 drives in four directions, (*a*) through gear 127 and gear 128 to operate the gear mechanism 41, as indicated schematically in FIG. 14, and in detail in FIGS. 18 and 20, (*b*) through idler 198, and gear 199 (like gear 127) serving as input gear to gear mechanism 42, (*c*) through 2 to 1 gear reduction 127, 197, 176, 177, and shaft 196 to cam 211 and potentiometers 28, 32, 35 in FIG. 13, and (*d*) gear 176 drives shaft 45 to drive cam 52, wiper of potentiometer 90, and wiper 14 of potentiometer 30, gear 176 being the same size as gear 197 whereby shaft 45 and elements driven by it operate at the same speed as gear ratios 41 and 42, while shaft 196 and the elements driven by it operate at half speed. By means of the differentials 122 and 123, the rotation of gear 128 is transmitted to shaft 162 in either a forward or a reverse direction. The details of this mechanism are more fully explained later. The differentials 110 to 119 inclusively are arranged in series on stationary shaft 161. One input of each differential 110 to 119 is from the corresponding differential 100 to 109 inclusively on shaft 162. The other input is from the output of the preceding differential 110 to 119, or in the case of the first differential 110, zero input is obtained from the gear 160 (FIG. 20) which is keyed by key 163 to the stationary shaft 161. Since the output of any of these differentials is ½ the sum of the inputs, it is apparent that the output of any given differential is divided by a factor of two for each succeeding differential in the gear train. Consequently, the output is proportional to the input, multiplied by the binary number which corresponds to the state of input differentials 100 to 109 inclusively, where a zero represents zero input through the differential and a one represents an input corresponding to shaft 162. A binary gear ratio operating on the same principle is described and claimed in Case 3.

The output of the X position servo motor 55, FIGS. 15 and 18 is added to the output of the gear ratio mechanism by differential 54 which is driven by motor 55 through reduction gears 178, 179 and 180. This differential is located between differentials 114 and 115. This is done to take advantage of the gear reduction in differentials 115 to 119 inclusive as part of the necessary gear reduction between the servo motor 55 and the output. It has the further advantage that any backlash contributed by differential 54 is divided by the above gear reduction. A magnetic brake 182, FIG. 18, is connected to the gear train through gears 180 and 181 and is used to lock motor 55 and the X position input when it has been positioned. The magnetic brake 217, FIG. 18, locks servo motor 65 when its input is zero. Since the output of differential 114 is reduced by a factor of two in passing through differential 54, the output of differential 54 is stepped up to the input of differential 115 by a factor of two through gears 183 and 184, FIG. 18. The resolvers 57, 58 and 59, potentiometer 70, drive motor 65 and differential 64 in FIG. 15 have previously been described and are shown in FIG. 18, associated with the gear mechanism 41.

*The Differential Mechanism, FIGS. 19 to 21 and 24*

FIG. 20 shows the differential mechanism in more detail. Gear 128 drives planetary gears 131 and 132 which are mounted on shaft 130 which is free to rotate in spider gear 129. The spider gear 129 is free to rotate on fixed shaft 161. Gear 132 meshes with gear 133 which is assembled to gear 134. The gear assembly 133—134 is free to rotate on shaft 161. Digerential 123 on shaft 162 is identical to differential 122 with output gear 140 corresponding to input gear 128. The spider gears 129 and 137 of the two differentials are engaged with each other. As shown in FIG. 21, a pair of gears 159 joined rigidly to each other, and free to rotate on their own center are meshed with spider gears 134 and 135 respectively. A detent 142, FIGS. 19 and 20, is carried by arm 187 which is pivoted on shaft 149. This detent can engage either notch 185 on spider gear 134 or notch 186 on spider gear 137. If the detent is engaged with the notch in spider gear 137 then both 137 and 129 are locked. In this condition, rotation of gear 128 drives through gears 131, 132, 133, 134, 159, FIG. 21, and 135, 136, 138 and 139, FIG. 20, to drive gear 140 in the same direction and at the same speed as gear 128. If, however, the detent 142 is engaged with notch 185 in gear 134, gear 134 is locked; and through gear 159, gear 135 is also locked. In this case, rotation of gear 128, through the planetary action of gears 131 and 132, drives spider 129, which in turn drives spider 137, and planetary gears 138 and 139, resulting in rotation of gear 140 at the same speed as gear 128 but in the opposite direction. Consequently, the rotation of shaft 162, which is keyed to gear 140, by key 141, is equal to the rotation of input gear 128 and in a direction which depends upon whether detent 142 is engaged with notch 185 or 186, being the same when engaged with 186 and opposite when engaged with 185.

The following description of the operation of the feed differential 100 and binary differential 110 applies to the ten identical sets (100, 110) (101, 111) (102, 112) (103, 113) (104, 114) (105, 115) (106, 116) (107 117) (108, 118) (109, 119) in the differential mechanism of FIG. 18. As shown in FIG. 20, spiders 164 and 170 are identical to spiders 129 and 137; likewise, planetary gear sets 171, 172 and 165, 166 are identical to previously described assembly 131—132 and 138—139. The assembly of gear 173 and detent shoe 174 is identical to the assembly 133 and 134 except that it does not carry a gear corresponding to the gear 134. A detent 169 is provided which is identical to detent 142 and which may be engaged either with notch 185' in spider 164 or with notch 186' in shoe 174. If engaged with spider 164, which is one of the inputs to differential 110, this input is locked and is equal to zero. Since spider 164, which is locked, is engaged with spider 170, it is also locked. Consequently, rotation of gear 140 through gears 171, 172 and 173 causes shoe 174 to rotate. If, however, detent 169 is engaged with shoe 174 rotation of gear 140 with the planetary action of gears 171 and 172 causes spider 170 to rotate with the planetary action of gears 165 and 166, which in turn drives spider 164 which is the equivalent of an input of one. In the case of the first differential 110 in the train, there is no previous differential, and therefore its input gear 160 is keyed to stationary shaft 161 by key 163 to produce a zero input. The output gear 168 is rigidly fastened to gear 188, the assembly being free to rotate on shaft 161. Gear 188 is the input gear to differential 111 and corresponds to gear 160 in differential 110. The transfer of detent 169 between notches 185', 186' in spider 164 and shoe 174 occurs only at positions corresponding to exactly half revolutions of shaft 162, at which point both notches are aligned exactly with the detent 169. If the detent 169 is in engagement with the shoe 174, ½ revolution of shaft 162 causes spider 164 to rotate one revolution. Likewise, when the detent 169 is engaged with spider 164, ½ revolution of shaft 162 causes one revolution of shoe 174. If the notch 186' in shoe 174 is not in alignment with the detent 169, the cylindrical surface of the shoe 174 forces the detent 169 to remain in engagement with the notch 185' in the spider 164 until the notches again line up after ½ revolution of shaft 162. Likewise, if the detent 169 is engaged with the notch 186' in the shoe 174, rotation of the spider 164 locks the detent until shaft 162 has completed ½ revolution. The position which the detent 169 takes when the two notches are in alignment is determined by the spring load due to springs 151 and 152, FIG. 19.

Detent 142, which determines the direction of rotation, is arranged on arm 187 shown in FIG. 19 which has an offset around the shaft 216 which connects the pair of gears 159, while detent 169 is arranged on a straight arm 201, FIG. 24, there being one arm like 201 for each one of the ten binary sets, 100 to 109. Also, while the variable cam-operated spring-tensioning device shown in FIG. 19 is illustrated as being applied to the arm 187 for detent 142, it is to be understood that a similar spring tension control including a solenoid like 213 is provided for each of the ten arms like 201.

As shown in FIG. 19, arm 143, pivoted on shaft 145 is deflected outwardly by cam 150 thereby applying tension to spring 151. Similarly, arm 144 pivoted on shaft 146 is allowed to move inwardly by cam 150, thus releasing the tension on spring 152. As a result, the detent 169 is forced towards engagement with notch 185'. While cam 150 could be rotated by shaft 175 to directly position arms 143 and 144, considerable force would be required to cause this cam rotation. In order to reduce this force, so that this rotation can be obtained by a light fast-operating solenoid 213, the following additional mechanism is incorporated. Shaft 145 carries an arm 153 which carries a roller 155 which bears against cam 157 attached to shaft 162. As shaft 145 is rotated counter-clockwise by the rise in cam 157, pin 147 bears against arm 143 causing it to rotate outwardly to a position somewhat farther than shown and with its outer end clear of cam 150. Similarly, cam 158, roller 156, arm 154, shaft 146 and pin 148 move arm 144 outwardly to a position symmetrical to arm 143. In this position, cam 150 is free of both arms and consequently can be rotated freely. In this position, springs 151 and 152 provide a force tending to center detent 169. At this time, however, the detents 142 and the ten detents like 169 are locked in position by one of the associated cylindrical surfaces and cannot change position. Further rotation of the cams 157 and 158 permits arms 143 and 144 to move inwardly under the influence of springs 151 and 152 until these arms encounter the cam 150. Depending upon the position of cam 150, tension remains in either spring 151 or 152 and positions the detents 142 or 169, etc., accordingly, when their slots come into alignment. The cams are so phased that motion of arms 143 and 144 occurs when their detents 142 or 169, etc., are in the locked position.

*Digital-to-Analog Converter, FIG 22*

FIG. 22 shows the digital-to-analog converter or multiplier used in the α and β mutipliers 12, FIG. 11, and in the ΔX and ΔY multipliers 15, FIG. 12.

The input voltage is applied to the primary winding 97 of transformer 96 which has 5 tapped secondary windings indicated at 98. The relative number of turns in each section of the secondary 98 and the relative voltage induced is indicated by the numbers 1X, 2X, 4X . . . 512X, which correspond to the successive powers of 2.

Ten relays indicated at 99, are provided, one relay for each section of one of the secondary windings 98. Relays 99, shown with their contacts in the normal or zero positions are energized by the digital data to connect the selected secondaries in series.

Consequently, the output voltage in line 221 is proportional to the input voltage applied to primary 97 multiplied by the binary input represented by the activation of one or more of the ten relays indicated at 99.

*Feed Rate*

It is desirable to keep the rate of cutting constant during the contouring of a part. However, the successive segments of the curve may not be equal in length. If varying values of ΔX and ΔY are used, it will be necessary to vary the speed of the feed rate motor 43, FIG. 15, in inverse proportion to the resultant of ΔX and ΔY, i.e., length of chord D.

This is accomplished by applying the ΔX and ΔY voltages to a resolver 19, FIG. 12, set at the slope angle $\phi$ between the tangent to the curve at the cutting point and the X axis. The output of this resolver is then proportional to D, the resultant of ΔX and ΔY. This voltage is used to excite an induction tachometer 44, FIG. 15, on the feed rate motor 43. The output of this tachometer is compared to the feed rate voltage from the feed rate digital-to-analog converter 10, FIG. 11. The difference between these two voltages is used to drive the feed rate motor 43 through the amplifier 27, FIG. 12. With *a* rather high gain in the amplifier 27, the speed of the servomotor 43 will be such that the tachometer 44 generates a voltage essentially equal to the voltage from the feed rate converter 10. In this case, the feed rate voltage is equal to the speed of the feed rate motor 43 multiplied by the resultant of ΔX and ΔY obtained from the above mentioned resolver 19. The feed rate motor 43 therefore runs at a speed equal to the feed rate voltage divided by the resultant of ΔX and ΔY. Since the gear ratio between the machine and the feed rate motor 43 is equal to the resultant of ΔX and ΔY, the machine speed is proportional to the feed rate voltage. In other words, the chord length D obtained from resolver 19 is fed to tachometer 44 in such a way that the speed of the feed motor 43 is inversely proportional to the chord length D.

Referring to changes of the feed rate in going from one segment to another, the feed rate motor 43 at the input to the gear change mechanisms 41, 42 has a speed inversely proportional to the chord length. The feed rates as applied to the output shafts of the gear change mechanisms are the components of the feed rate in X and Y. The combined action results in a constant resultant cutting rate.

*Stopping the Machine*

When it is required to stop the machine motion for an inside corner, an outside corner, or at the end of a contour, it is necessary to slow down the feed rate for a sufficient distance to prevent possible overshoot of the feed rate drive and the machine. This is accomplished by switching in a voltage different from the reference voltage 222, FIG. 11, normally used as input to the feed rate converter 10. This different voltage is obtained from a potentiometer 90, FIG. 14, on the feed rate motor shaft 45. The voltage obtained from this potentiometer 90 is amplified and limited by limiter 91 to a value equal to the reference voltage 222. However, when the potentiometer 90 nears its end point, the output voltage then decreases from this limited value to zero. The distance from the end point where this happens can be varied by varying the gain in the amplifier 92, FIG. 11, before the limiter 91. By this means, the output of the feed rate converter 10 is held constant until the machine has almost reached the desired stopping point at which time the voltage decreases to zero.

This arrangement causes the feed rate motor 43 to slow down and stop smoothly without coasting or overshoot. As shown by the switches 93a, FIG. 11, this limited voltage is used only for the routine of stopping or turning a corner. For usual continuous contour cutting, the constant reference voltage 222 is used.

To insure sufficient damping of the feed rate motor 43 as it stops, the resolved output from the ΔX and ΔY resolver 19 is replaced by a reference voltage 223. This is done with another contact 93b, FIG. 12, on the same switch 93a that controlled the feed rate reference 222 mentioned above. The reference voltage 223 replacing the ΔX and ΔY resolved voltage is greater in magnitude than any possible value of ΔX and ΔY. The insertion of the larger reference voltage 223 therefore causes an immediate slowing down of the feed rate because of the larger generated voltage from the induction generator 44. This causes a rather quick slowing down of the machine operation, followed by slowing to a stop when the end of the cycle is reached. A brake and clutch assembly 94, FIGS. 14 and 18, operated by switch 53 is provided to disconnect the feed motor 43 and lock the input shaft 45 at the exact end of the cycle.

The resetting of switch 53 is in effect accomplished by the action of relay 95 when the shaft of resolver 18 has been rotated to its new $\phi$ value. The relay 95 by way of the "stop and corner control circuit" re-energizes the clutch and releases the brake 94.

*Corner Routine*

Corners and discontinuities in curves require some form of discontinuous operation in the analog computer. As previously described, the feed rate servomotor 43 is stopped at such corners, using the potentiometer 90 and the reference voltage 223 switched in by switch 93b. At this time, the new ΔX and ΔY data is read into the storage relays 214 and transferred into the differentials in the normal manner, but the feed rate motor 43 is stopped and held stationary by the clutch-brake 94. The new data for the curve after the break or corner results in a new slope angle. It should be noted that for continuous operation, there is no change of curve slope angle between the end of one segment and the start of the next. However, the slope angle servomotor is still at the slope angle of the curve before the break. Therefore, there will be an error signal input to the amplifier 22, FIG. 12, resulting in the motor 21 running towards the new slope angle. When this slope angle servomotor 21 has reached a position corresponding to the new slope angle, the servo null relay 95, FIG. 12, will close. Relay 95 is connected in the circuits controlling the brake and clutch 94 on the feed rate motor 43. Thus, when the slope angle servomotor 21 has reached its null, the feed rate motor 43 is allowed to start again and proceed along the new segment of the curve.

During the rotation of the slope angle servomotor 21, the resolver 20 is continuously computing the components of tool radius as previously described. These two outputs are continuously added to the outputs of the X and Y drives in the same manner as before. Therefore, the X and Y differentials 64 and 226 driven by servomotors 65 and 224 are continuously adding in the components of tool radius causing the shafts 63 and 218 to rotate the required amount to drive the machine elements 82 and 220 accordingly. Therefore these machine elements are controlled so that the cutter always remains in contact with the corner being cut. In other words, at the corner, the machine will describe a circle having a radius equal to the cutter radius selected by the adjustment of the cutter radius potentiometer 85.

The analog computer 10 has no way to determine that the above corner routine is required and this information is therefore coded on the tape 3'. The code causes the feed rate servomotor 43 to go into the stop sequence, and the new data read in at that time causes the slope angle servomotor 21 to drive. The closing of its null relay 95 causes the brake and clutch 94 to release the feed rate motor 43, and the cycle then continues as before. During discontinuity, as at corners, the large value of error at the output of amplifier 22 will cause relay 95 to open, braking the feed rate motor 43. When the slope angle servomotor 21 has reached its new position, the relay 95 closes allowing the feed rate motor to proceed.

An advantage in using relay 95 in this manner is that the machine will stop operating whenever the error is excessive during continuous curve operation.

The error is normally below the relay actuating value at all times except when the curve is discontinuous, at which time, the error value becomes large. This allows for continuous operation within the segment and the motor 43 does not stop and start during this time. From the above, it can be seen that the tape 3' does not control relay 95.

Since, in proper operation, the angle $\phi$ is substantially the same at the end of one segment and the start of the next one, there is no discontinuity in the shaft angle position of motor 21. The switching of new values into the multipliers 15 at the start of a new segment therefore results in no appreciable change in the angle $\phi$ represented by the two vector values being fed into resolver 18.

Within a segment, it is the values ΔΔX and ΔΔY (see FIGS. 6a and 6b), which change smoothly and gradually, and which cause the gradual and continuous change of the $\phi$ position of the slope angle servomotor 21.

The distributor 5' may be a stepping switch and the stop and corner control 38 and translator 6', FIG. 11 and interpolator sequence control 215, FIG. 14, may embody relays. Details of the circuits for these items are not shown as being unnecessary for an understanding of the invention and obvious to those skilled in the art from the above description of their functions.

I claim:

1. The combination of an input drive shaft, a plurality of series of speed ratio gear cells, the cells of each series except the last cell, having an output drive acting as an input drive to the next cell, separate gearing connecting said input drive shaft to the first cell in each of said series, an electrical input and means controlled thereby for changing the speed ratio of each of said cells, another electrical input and means controlled thereby for controlling the drive of said input shaft, the last cell of each of said series having an output drive shaft, said output drive shafts operating in coordinate relation in accordance with the said electrical inputs for the speed ratio changing means for said cells.

2. The combination according to claim 1 and including a differential gear device intermediate successive cells in each of said series and input means for said differentials for positioning said output drive shafts prior to the operation of said input shaft.

3. The combination according to claim 1 and including a brake and clutch device for said input drive shaft, a switch device operated at a definite cyclic position of said input drive shaft, and control means controlled by said switch device for controlling said brake and clutch device.

4. The combination according to claim 1 and including driven elements arranged on coordinate axes controlled by said output shafts respectively.

5. The combination according to claim 1, said speed ratio changing means including an actuator and means controlled thereby for changing the gear ratio of the cell from one amount to another amount, each of said cells including a rotary member, and a detent and notch device for each actuator and the corresponding rotary member of the cell for preventing change from one gear ratio to another until a definite cyclic position of the rotary member is reached.

References Cited in the file of this patent

UNITED STATES PATENTS 2,476,673    May et al. _____ July 19, 1949
2,840,771    Kamm _____ July 24, 1958

OTHER REFERENCES

Electronic Engineering (Nettell et al.), March, 1956, pages 108–114.

Automation (McRainey), May 1957, pages 83–91.